(12) United States Patent
Albonetti

(10) Patent No.: US 11,644,396 B2
(45) Date of Patent: May 9, 2023

(54) MEASURING APPARATUS AND METHOD FOR CAPSULES

(71) Applicant: SACMI Cooperativa Meccanici Imola Societa' Cooperativa, Imola (IT)

(72) Inventor: Danilo Albonetti, Imola (IT)

(73) Assignee: SACMI COOPERATIVA MECCANICI IMOLA SOCIETA' COOPERATIVA (*) Notice: Subject to any disclaimer, the term of this patent is extended or adjusted under 35 U.S.C. 154(b) by 173 days.

(21) Appl. No.: 17/215,109

(22) Filed: Mar. 29, 2021

(65) Prior Publication Data
US 2021/0356368 A1 Nov. 18, 2021

(30) Foreign Application Priority Data

May 14, 2020 (IT) .................... 102020000011038
Dec. 23, 2020 (IT) .................... 102020000032168

(51) Int. Cl.
G01N 3/08 (2006.01)
G01N 3/06 (2006.01)
(Continued)

(52) U.S. Cl.
CPC .............. *G01N 3/08* (2013.01); *G01N 3/066* (2013.01); *B65D 41/3447* (2013.01);
(Continued)

(58) Field of Classification Search
CPC .. G01N 3/08; G01N 3/066; G01N 2203/0017; G01N 2203/0067;
(Continued)

(56) References Cited

U.S. PATENT DOCUMENTS 4,794,801 A 1/1989 Andrews et al.
4,850,230 A 7/1989 Eldridge
(Continued)

FOREIGN PATENT DOCUMENTS

CN 210427316 U 4/2020
EP 3623791 A1 3/2020
(Continued)

OTHER PUBLICATIONS

Mecmesin Limited, Solutions@Mecmesin: Tamper-proof Closure Push-out Test, Jan. 9, 2019, https://closuretesting.com/sites/default/files/CS118%20Tamper-Proof%20Closure%20Test.pdf (accessed Jan. 19, 2021).

*Primary Examiner* — Jonathan M Dunlap
(74) *Attorney, Agent, or Firm* — Laubscher & Laubscher P.C.

(57) ABSTRACT

There are disclosed a measuring apparatus and method for measuring the pull-off force of a frangible arrangement connecting a capsule with a tamper evident band of closed annular shape, with an annular ridge that axially retains the tamper evident band, a pusher device that pushes the capsule so as to cause the breakage of the frangible arrangement, a sensor arrangement to detect the tensile force applied by the pusher device, and a lifting and abutting device arranged for supply the capsule to the annular ridge.

There are further disclosed a band disengagement arrangement for disengaging the tamper evident band from the annular ridge after the breakage of the frangible arrangement, yet maintaining intact the closed annular shape of the tamper evident band.

20 Claims, 16 Drawing Sheets

(51) Int. Cl.
*B65D 41/34* (2006.01)
*B65D 55/16* (2006.01)
*G01L 5/00* (2006.01)

(52) U.S. Cl.
CPC ............... *B65D 55/16* (2013.01); *G01L 5/00* (2013.01); *G01L 5/0071* (2013.01); *G01N 2203/0017* (2013.01); *G01N 2203/0067* (2013.01); *G01N 2203/04* (2013.01); *G01N 2203/0676* (2013.01)

(58) Field of Classification Search
CPC ........ G01N 2203/04; G01N 2203/0676; G01L 5/00; B65D 55/16; B65D 41/34; B65D 41/3442; B65D 41/3447
See application file for complete search history.

(56) References Cited

U.S. PATENT DOCUMENTS

| | | |
|---|---|---|
| 9,816,884 B2 | 11/2017 | Gerber et al. |
| 2022/0034736 A1* | 2/2022 | Burri ..................... G01L 5/009 |

FOREIGN PATENT DOCUMENTS

| | | | |
|---|---|---|---|
| EP | 4019925 A1 * | 6/2022 | |
| JP | H07134076 A | 5/1995 | |
| JP | 2004028745 A | 1/2004 | |
| JP | 2004028957 A | 1/2004 | |
| JP | 2012189536 A | 10/2012 | |

\* cited by examiner

Fig. 14
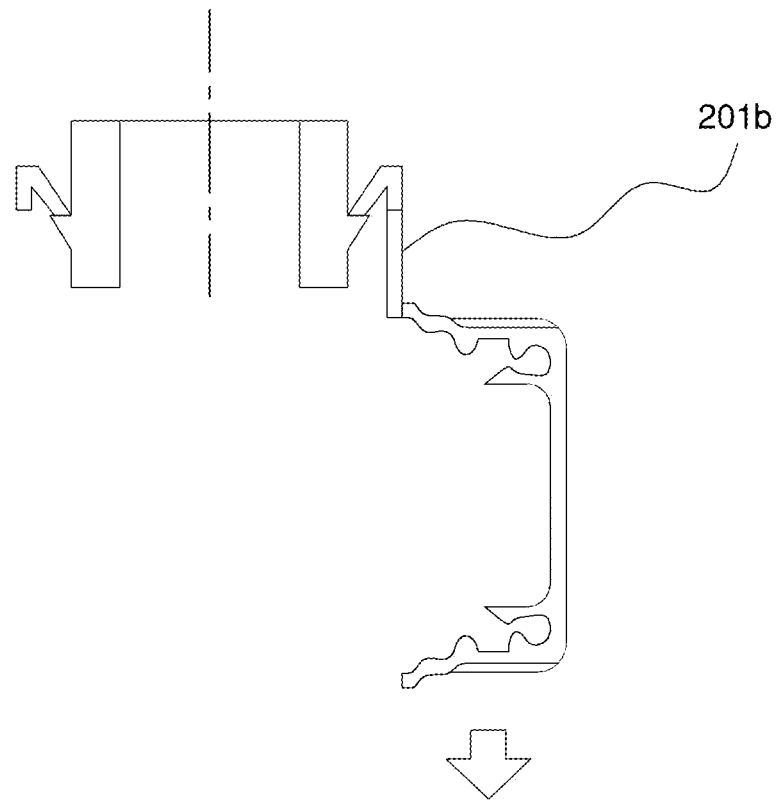
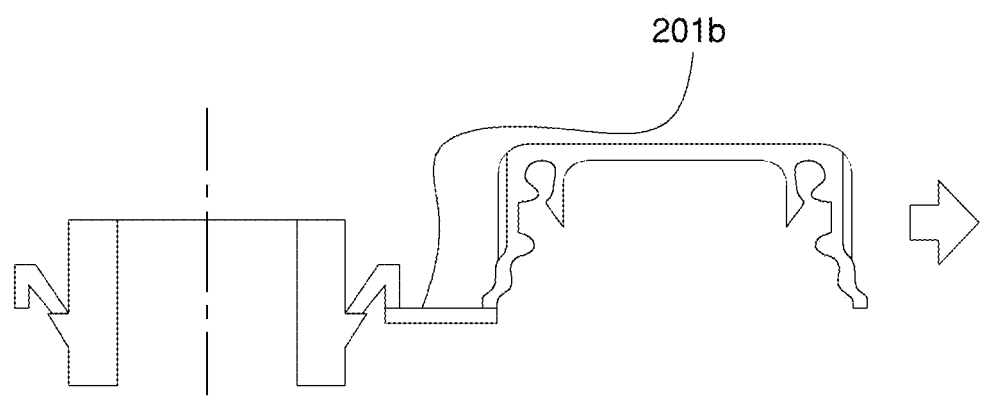
Fig. 15

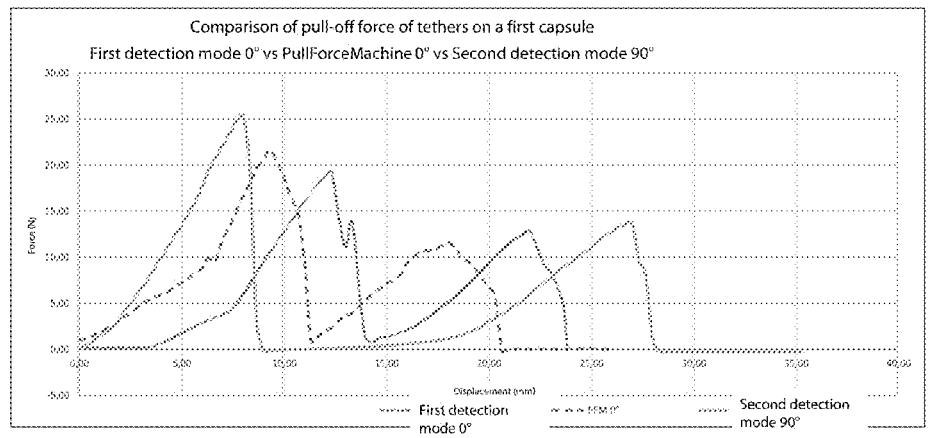
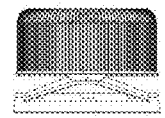
Fig. 16a
Fig. 16
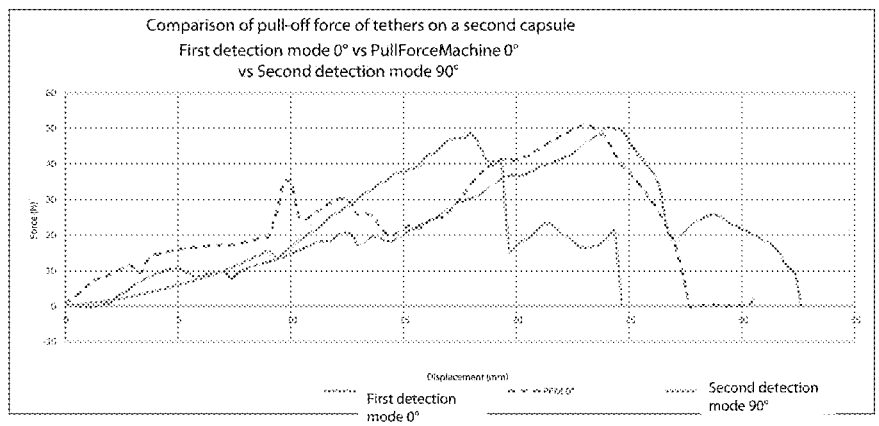
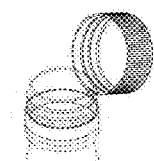
Fig. 17a
Fig. 17
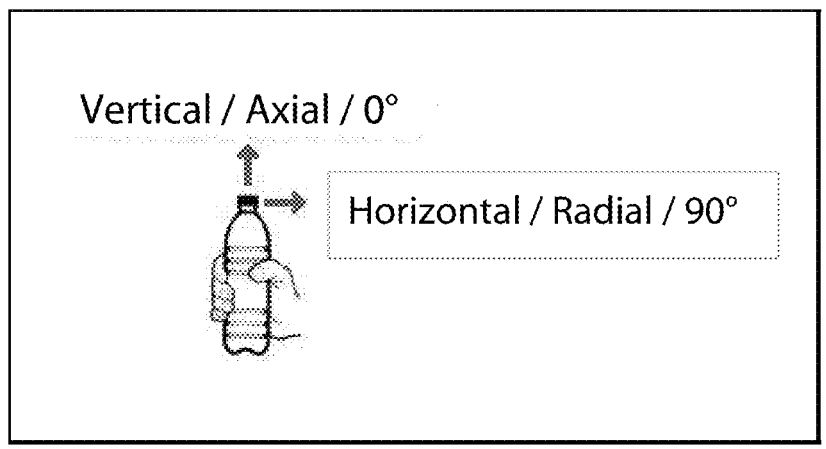
Fig. 18

Fig. 23
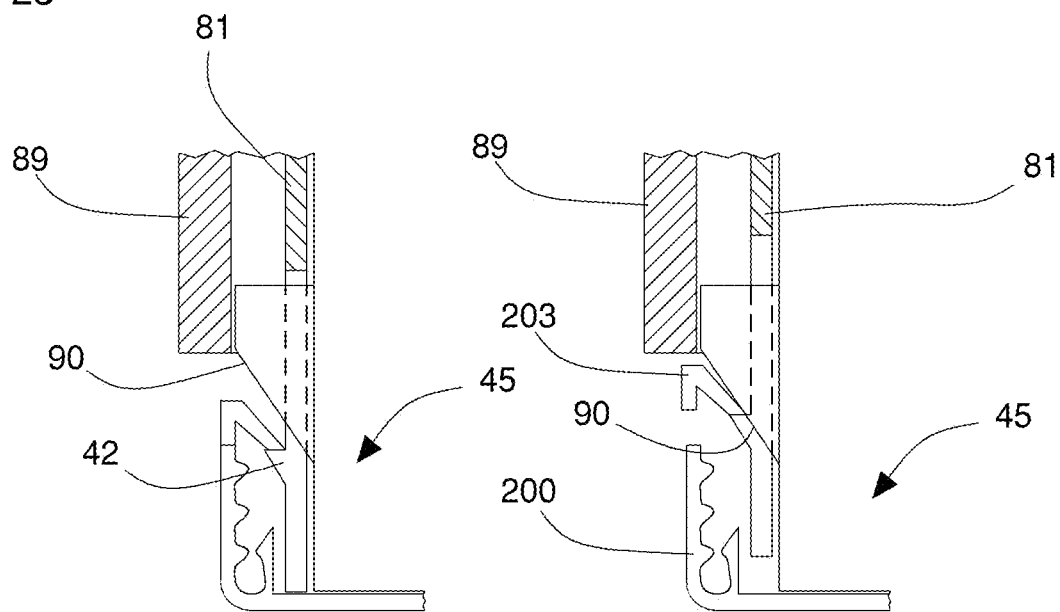
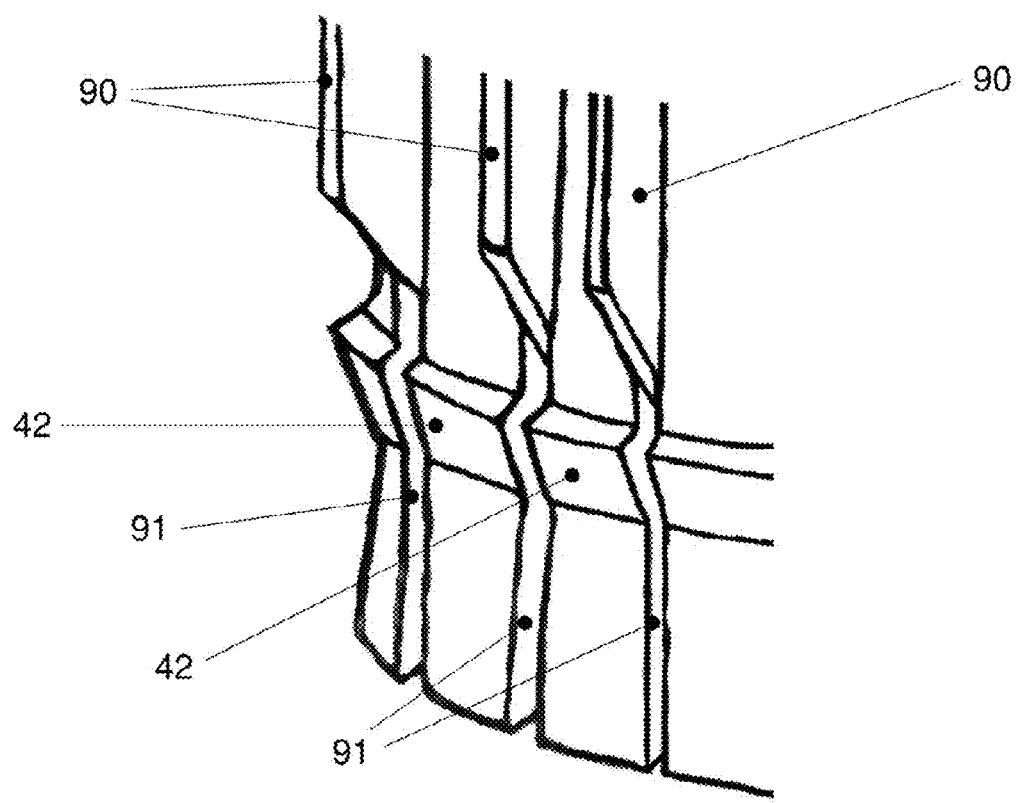
Fig. 24

MEASURING APPARATUS AND METHOD FOR CAPSULES

CROSS-REFERENCE TO RELATED APPLICATIONS

This application claims priority of Italian Patent Application Nos. IT02020000011038 filed on May 14, 2020 and IT102020000032168 filed on Dec. 23, 2020. The entire content of these applications is incorporated herein by reference.

BACKGROUND OF THE INVENTION

The invention relates to a measuring apparatus and method for measuring the pull-off force of connecting elements of a capsule or a closure, specifically of capsules or closures made of plastic material of the kind used for closing containers such as bottles, for example.

Specifically, but not exclusively, this invention relates to a measuring apparatus and method for measuring the pull-off force of connecting elements arranged for connecting portions of a side wall of the capsule to portions of a tamper evident band, or safety ring, with which the capsule is provided. Specifically, the connecting elements comprise bridge elements, or bridges, namely elements made of plastic material intended for being fractured by a user during a first opening of the container with the capsule applied thereon, so as to provide evidence of the tampering of the container closure, and/or at least one tether element, which by contrast enables to retain the capsule on its tamper evident band even after the container has been opened.

Measuring apparatuses for measuring the pull-off force of bridge elements are known that subject the capsule to a stress applied to an end wall of the capsule, substantially perpendicularly thereto.

Such measuring apparatuses comprise a detecting unit for the pull-off force of the bridge elements, provided with a tubular element with an annular ridge obtained on its outer surface, to which retaining elements of the tamper evident band of the capsule may be connected.

The tubular element provided with the annular ridge simulates the neck of the container, which in use is engaged by the capsule, so as to close the container. The capsule comprises a cup-shaped body defined by the side wall and by the end wall extending transversely with respect to the side wall. The side wall is provided with a closed end arranged at the end wall, and with an open end opposite to the closed end.

In use, the tubular element is axially movable for approaching a resting plane of the measuring apparatus, onto which the capsule is arranged with the open end facing upwards, until the retaining elements engage the ridge. As such, the capsule is retained on the tubular element.

After that, the tubular element is moved away from the resting plane, and a substantially cylinder-shaped piston, with which the detecting unit is provided, slidable within the tubular element, pushes downwards, namely towards the resting plane, a bottom surface of the end wall of the capsule until the bridges break. In other words, the piston is arranged to apply a normal stress to at least a portion of the bottom surface of the end wall, along a direction substantially perpendicular to, and especially coinciding with, a longitudinal axis of the capsule. A load cell is associated with the piston to detect the axial force applied by the latter to the bottom surface of the end wall, depending on its movement towards the resting plane. Such axial force translates into a tensile stress applied to bridge elements.

However, known-type apparatuses for measuring the pull-off force of connecting elements of a capsule have some limits and drawbacks.

Indeed, known-type apparatuses for measuring the pull-off force of connecting elements of a capsule may be used only to determine the pull-off force of the bridge elements, but not that of the tether elements, as well. Indeed, when all bridge elements of the capsule are broken, the side wall tilts with respect to the longitudinal axis of the capsule (when mounted on the tubular element), along which the force applied by the piston is directed, and at least one portion of the tamper evident band remains attached to at least one portion of the side wall by means of at least one tether element. As such, the piston fails to subject the at least one tether element, remained attached to the side wall, on one side, and to the tamper evident band, on the other side, to a tensile stress, because there is no abutting surface against which the piston may stop to exert a mechanical stress, and to subject the at least one tether element to a strain.

Moreover, the force measurements detected by the known-type apparatuses for measuring the pull-off force of connecting elements of a capsule turn out to be poorly reliable, as some bridge elements may not be subjected to a tensile force since no strain is applied thereto. Indeed, though the piston applies a uniform force to, and at the center of, the bottom surface of the end wall, not all bridge elements may break, but only a part thereof. This implies the risk that the capsule might tilt with respect to the longitudinal axis of the capsule, along which the force applied by the piston is directed, and that the piston might continue its stroke without abutting against the capsule due to the tilting thereof.

As a result, some bridge elements may undergo no stress, the measurement of the detected pull-off force thus turning out to be inaccurate.

SUMMARY OF THE INVENTION

It is an object of the invention to provide a measuring apparatus and/or method that obviates one or more of the aforesaid prior art drawbacks.

It is another object of the invention to provide a measuring apparatus and/or method that obtains an accurate measurement of the force applied to the connecting elements of the capsule to be tested.

It is a further object to provide a measuring apparatus and/or method for measuring the values of a force applied to the connecting elements of a capsule, that are highly versatile as they may be employed to test the breakage of both bridge elements and tether elements, with which the capsule may be provided.

It is yet another object to provide a measuring apparatus that may be employed both as a laboratory apparatus, namely detached from a capsule processing line, and in line, namely as an apparatus connected to a portion of the capsule processing line, at a section for the passage of capsules, from which a capsule may be picked up for testing in the measuring apparatus according to the invention.

It is yet a further object of the invention to provide a measuring apparatus that may be easily installed in a pre-existing processing line of the capsules without needing to make substantial changes to the processing line itself.

It is another object to obtain a versatile measuring method that allows to use the detected force values to assess the quality of the tamper evident band, and, as a consequence, to make modifications to the working parameters of the processing line.

It is an object of the invention to provide a measuring apparatus and/or method for capsules with tamper evident band, that allows to easily remove the tamper evident band after the breakage of the frangible arrangement.

According to the invention, there are provided an apparatus and a method for measuring the pull-off force of connecting elements of a capsule, as defined by the attached claims.

Owing to the invention, it is possible to provide a measuring apparatus that guarantees a correct measurement of the axial force applied to a capsule by a pusher device to measure the pull-off force of the connecting elements of the capsule. Indeed, the measuring apparatus according to the invention comprises an abutting surface arranged to interact with an outer surface of the end wall of the capsule, such that during the application of the axial force, the capsule is prevented from heeling over, namely from making a rotation with respect to an axis that is substantially parallel to a longitudinal axis of the pusher device, such rotation impeding the breakage of at least part of the connecting elements of the capsule.

Moreover, owing to the measuring apparatus according to the invention, it is possible to measure the pull-off force of both the bridge elements and the tether elements of a capsule.

Still, the measuring apparatus according to the invention may be used both in stand-alone fashion, as a laboratory testing apparatus, namely detached from a capsule processing line, and in line, namely as an apparatus connected to a portion of the capsule processing line, arranged downstream of a cutting apparatus, or knife, that makes the connecting elements of the capsule. Especially, the measuring apparatus comprises a cap supplying guide that connects to a section of the processing line along which there is the passage of the capsules that, in use, are deviated, especially on a sample basis, by means of a deviating device, towards the supplying guide that conveys the deviated capsule to the measuring apparatus.

Moreover, the measuring apparatus according to the invention may be easily installed in pre-existing capsule processing lines without needing to make substantial changes to the processing line itself.

Moreover, in an example of measuring apparatus according to the invention, it is possible to provide a measuring apparatus for measuring the pull-off force of the connecting elements of a capsule, which allows for a rotation of the capsule around its longitudinal axis, such that a vision system may detect features of the tamper evident band and/or of the connecting elements, such as a size of the bridge elements, an angular distribution of the bridge elements, a regularity of the cut made by a knife, intended for forming the tamper evident band, or safety ring, of the capsule.

Moreover, rotating the capsule to be subjected to a strain allows for its angular orientation, namely for its phasing, according to a position of a reference element of the capsule, e.g., a connecting element such as the at least one tether element.

Owing to the measuring method according to the invention, force values can be detected in a highly reliable manner; moreover, the measuring method according to the invention allows to use the detected force values to assess the quality of the tamper evident band. Indeed, by analyzing the detected force values it is possible to determine whether the knife, that cuts the side wall of the capsules to obtain the bridge elements (and thus the tamper evident band) on such side wall, and one or more of the tether elements, is worn and needs replacement or maintenance.

In an example of a second aspect of the invention, a measuring apparatus comprises an annular ridge that axially retains a tamper evident band of a capsule, a pusher device that pushes the capsule so as to cause the breakage of a frangible arrangement connecting the tamper evident band with the capsule; a sensor arrangement to detect the pull-off force applied by the pusher device; and a band disengagement arrangement for disengaging the tamper evident band from the annular ridge after the breakage of the frangible arrangement, yet maintaining intact the closed annular shape of the tamper evident band, especially by pushing the band radially outwards by means of a radial thrust element and/or by causing an inward collapsing of the annular ridge, after the breakage of the frangible arrangement.

Some examples relating to the second aspect of the invention are described below.

Example 1

In the Example 1, the measuring apparatus comprises:
a tubular element with a vertical axis;
an axial thrust element axially movable inside said tubular element and configured to push downwards a capsule provided with a frangible arrangement which connects the capsule with a tamper evident band of closed annular shape in order to cause breakage of the frangible arrangement;
an annular ridge which projects radially from said tubular element and which comprises at least one reaction surface configured to axially hold the tamper evident band when said axial thrust element pushes downwards the capsule to cause said breakage, said reaction surface being extended in a circumferential direction and comprising an external diameter greater than an internal diameter of the tamper evident band;
a sensor arrangement configured to detect at least one force exerted by said axial thrust element on the capsule;
a band disengagement arrangement configured to cause at least one relative movement between said annular ridge and the tamper evident band after said breakage, said relative movement comprising a radial widening of the tamper evident band and/or a radial collapse of said annular ridge, whereby, due to the effect of said relative movement, the tamper evident band remains intact, i.e. of closed annular shape, with an internal diameter of the tamper evident band greater than an external diameter of said annular ridge to allow the disengagement of the tamper evident band.

Example 2

The Example 2 is an apparatus according to the Example 1, wherein said band disengagement arrangement comprises a radial thrust portion configured to radially widen outwards the tamper evident band.

Example 3

The Example 3 is an apparatus according to the Example 2, wherein said radial thrust portion is movable so as to assume at least one first contracted configuration, in which said radial thrust portion is arranged radially inside said reaction surface, and at least one second expanded configuration, in which said radial thrust portion is displaced radially outward with respect to said first configuration to radially push and remove the tamper evident band beyond said annular ridge.

Example 4

The Example 4 is an apparatus according to the Example 3, comprising at least one actuator configured to drive a movement of said radial thrust portion between said first configuration and said second configuration.

Example 5

The Example 5 is an apparatus according to any one of Examples 2 to 4, wherein said radial thrust portion comprises two or more sectors, arranged along a circumference, each of which can be moved in a radial direction.

Example 6

The Example 6 is an apparatus according to any one of Examples 2 to 5, wherein said radial thrust portion comprises an internal profile configured for contact with an external counter profile of said axial thrust element in a manner that an upward motion of said axial thrust element causes a radial thrust outwardly of said radial thrust portion by effect of said contact between said internal profile and said external counter profile.

Example 7

The Example 7 is an apparatus according to the Example 6, wherein said internal profile is arranged on one end of one or more elastic elements configured to return elastically to rest towards said first configuration.

Example 8

The Example 8 is an apparatus according to the Example 7, wherein said internal profile is arranged on a lower end of a circumferential arrangement of said elastic elements around said vertical axis, each of said elastic elements comprising an element that is elongated in the axial direction.

Example 9

The Example 9 is an apparatus according to the Example 7 or 8, wherein each of said one or more elastic elements comprises a portion of said tubular element defined on two sides by two through openings or notches in said tubular element.

Example 10

The Example 10 is an apparatus according to any one of Examples 2 to 9, wherein said radial thrust portion comprises a thrust profile attached to, and protruding radially from, said axial thrust element, said thrust profile being configured in such a way as to radially widen outwards the tamper evident band by effect of a downward movement of said axial thrust element, said thrust profile being inserted into one or more vertical slots made in said tubular element; said thrust profile comprising, in particular, at least one circumferentially arranged thrust surface of an inverted flared shape, that is, wider towards the top.

Example 11

The Example 11 is an apparatus according to the Example 10, wherein said thrust profile comprises a plurality of distinct profile portions, with circumferential arrangement, each of which is inserted in a respective slot.

Example 12

The Example 12 is an apparatus according to any one of the Examples 1 to 11, wherein said band disengagement arrangement comprises a collapsible portion of said tubular element, said annular ridge being arranged on said collapsible portion, said collapsible portion being capable of assuming an expanded retention configuration, in which said annular ridge can axially retain the tamper evident band, and a collapsed release configuration, in which said annular ridge collapses radially inwardly with respect to said expanded retention configuration and can release the tamper evident band, said collapsible portion being configured to assume said collapsed release configuration after said axial thrust element has caused said breakage of the frangible arrangement.

Example 13

The Example 13 is an apparatus according to the Example 12, wherein said collapsible portion comprises one or more longitudinal elastic elements extending vertically in length, each of said one or more elastic elements being configured to rest in said collapsed release configuration, said apparatus comprising an abutment arrangement arranged to maintain said one or more elastic elements in said expanded retention configuration while said axial thrust element pushes the capsule downwards.

Example 14

The Example 14 is an apparatus according to the Example 13, wherein said abutment arrangement comprises said axial thrust element which can sequentially assume an intermediate position, a lower position and an upper position; in said intermediate position said axial thrust element opposes said one or more elastic elements to keep them in said expanded retention configuration and allows a lifting of the capsule to engage the tamper evident band in said annular ridge; in said lower position said axial thrust element opposes said one or more elastic elements to keep them in said expanded retention configuration after having pushed the capsule downwards; in said upper position said axial thrust element leaves said one or more elastic elements free to collapse in rest position towards said collapsed release configuration.

Example 15

The Example 15 is an apparatus according to any one of the Examples 1 to 14, comprising:
a lifting element configured to transport the capsule at least from a lower position, in which the capsule is distant from said annular ridge, to an upper position, in which the tamper evident band of the capsule has passed said annular ridge and can be axially retained by it; and/or an axial thrust portion configured to axially thrust the tamper evident band downwards after said band disengagement arrangement has caused said relative movement between annular ridge and tamper evident band.

Examples 16

The Example 16 is a measuring method, comprising the steps of:
providing a capsule with a closed annular shaped tamper evident band;
engaging said tamper evident band with an annular ridge;
pushing the capsule with said tamper evident band engaged with said annular ridge to cause a breakage of a frangible arrangement which connects the capsule with the tamper evident band;
detecting at least one force impressed on the capsule to cause said breakage of the frangible arrangement;
after said breakage, causing at least one relative movement between said annular ridge and the tamper evident band, said relative movement comprising a radial widening of the tamper evident band and/or a radial collapse of said annular ridge, whereby, due to the effect of said relative movement, the tamper evident band can be removed out of said annular ridge remaining of closed annular shape.

BRIEF DESCRIPTION OF THE DRAWINGS

The invention can be better understood and implemented with reference to the attached drawings, which show some embodiments thereof by way of non-limiting examples, in which:

FIG. 14 shows a first mode for detecting the pull-off force of tether elements of a capsule, that may be implemented in the measuring apparatus in FIG. 1;

FIG. 15 shows a second mode for detecting the pull-off force of tether elements of a capsule, that may be implemented in the measuring apparatus in FIG. 1;

FIG. 16 shows a graph illustrating the trend of the pull-off force detected by the measuring apparatus according to the invention, as well as the trend of the pull-off force detected via the first mode of detection and via the second mode of detection when a first capsule undergoes a tensile test;

FIG. 16a shows an example of the first capsule;

FIG. 17 shows a graph illustrating the trend of the pull-off force detected by the measuring apparatus according to the invention, as well as the trend of the pull-off force detected via the first mode of detection and via the second mode of detection when a second capsule undergoes a tensile test;

FIG. 17a shows an example of the second capsule;

FIG. 18 shows the direction and sense of the force applied to a capsule according to the first mode of detection and according to the second mode of detection, with respect to a bottle on which the capsule may be mounted;

FIG. 23 schematically shows a vertical elevation of another exemplary measuring apparatus implemented according to the present invention, in a tamper evident band connection configuration (on the left) and in a tamper evident band release configuration (on the right);

FIG. 24 shows a perspective view of a detail of the apparatus in FIG. 23.

DETAILED DESCRIPTION

Figure 1:
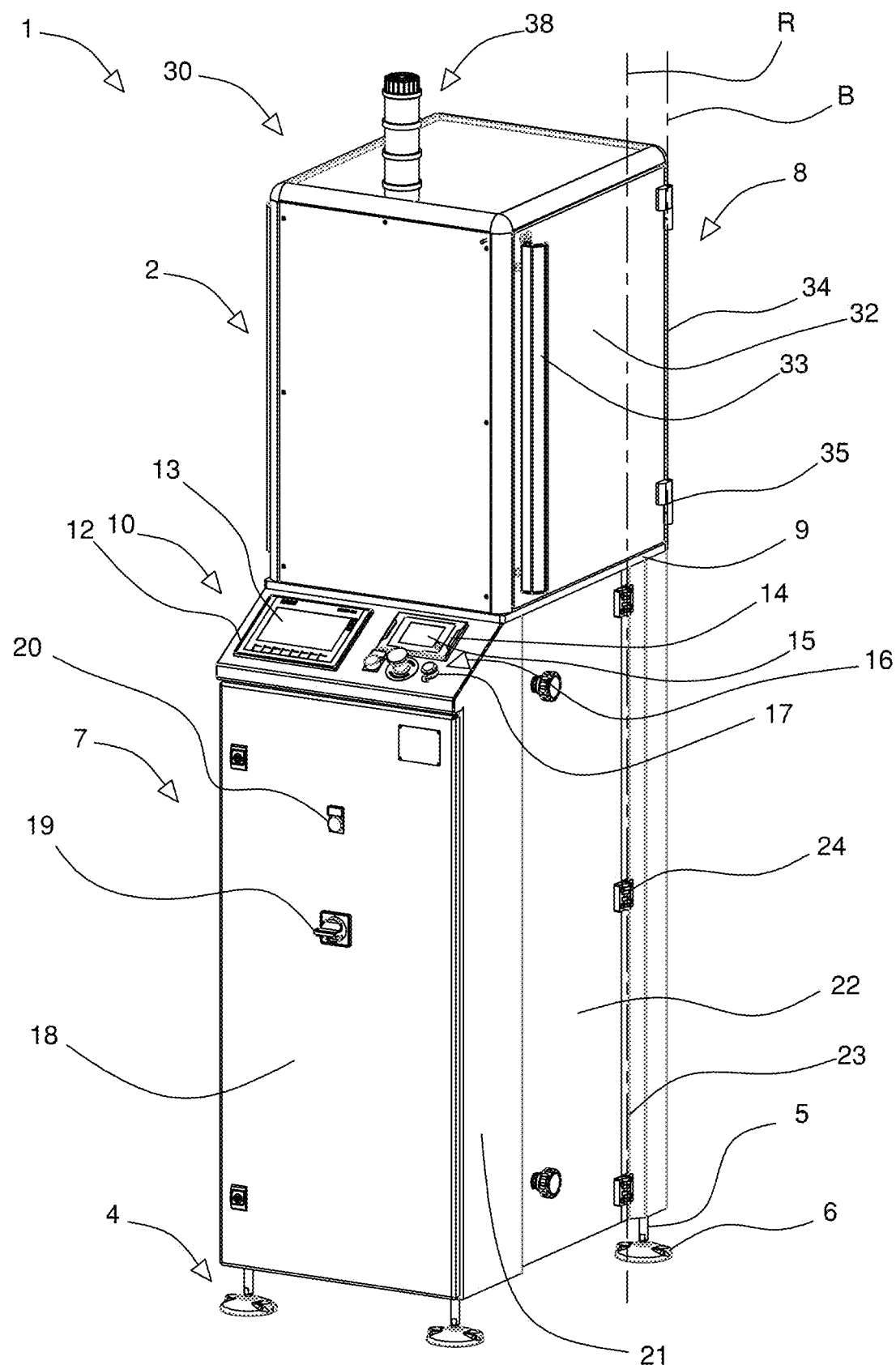
FIG. 1 is a perspective view of an example of a measuring apparatus implemented according to the present invention, illustrating a front part of the measuring apparatus.

Referring to the aforementioned figures, a measuring apparatus, also called PFM, which stands for Pull Force Machine, is indicated as a whole by reference numeral 1, and is arranged to measure the pull-off force of connecting elements 201 (FIGS. 6 and 8) with which a capsule, or closure, 200 (FIG. 6) is provided. Specifically, the measuring apparatus 1 measures the pull-off force of the connecting elements 201 by subjecting the capsule 200, and hence the connecting elements 201, to a tensile force.

The capsule 200 is made of plastic material, and is of the kind used for closing containers such as bottles, for example.

The connecting elements 201 are arranged to connect portions of a side wall 202, with which the capsule 200 is provided, and which may be cylindrical in shape, to portions of a tamper evident band, or safety ring, 203, with which the capsule 200 is provided, and which are substantially annular in shape. The tamper evident band 203 is suitable to provide a user with information about the integrity of a product packaged in the container.

Specifically, the connecting elements 201 comprise bridge elements, or bridges 201*a* (schematically illustrated in FIGS. 6 and 9), namely elements made of plastic material intended for being fractured by a user during a first opening of the container with the capsule 200 applied thereto, so as to provide evidence of the tampering of the container closure; and/or at least one tether element 201*b* (FIGS. 8, 13, 14 e 15) which by contrast enables to retain the capsule 200 on its tamper evident band 203 even after the container has been opened.

The capsule 200 further comprises an end wall 204 extending transversely of the side wall 202.

The capsule 200 comprises a cup-shaped body 210 defined by the side wall 202 and by the end wall 204. The side wall 202 is provided with a closed end 205 arranged at the end wall, and with an open end 206 arranged at the tamper evident band 203. At one end, in particular at the closed end 205, the end wall 204 delimits the side wall 202.

Provided on the end wall 204 is a seal element 207 that allows to isolate the product contained in the bottle from the outer environment.

The seal element 207 may have a substantially annular shape projecting from a bottom surface 214 of the end wall 204.

The seal element 207 comprises an inner seal surface 215 facing towards the interior of the capsule 200, namely towards a longitudinal axis A of the capsule 200.

The side wall 202 comprises an outer side surface 208 which may be provided with a knurled area 209 that allows a user to grasp the cup-shaped body 210 more easily to screw/unscrew it thereon/therefrom.

The side wall 202 further comprises an inner side surface 216 with an inner thread 217 obtained thereon, suitable to engage an outer thread of the bottle.

The tamper evident band 203 is associated with an edge 211 of the cup-shaped body 210 opposite to the end wall 204.

Between the cup-shaped body 210 and the tamper evident band 203 is defined an intended separation line that may comprise a plurality of cuts or openings spaced out by the connecting elements 201.

Retaining elements 213 project from an inner annular surface 212 of the tamper evident band 203, substantially radially towards the longitudinal axis A of the capsule 200, these being suitable, in use, to interact with an annular ridge of the bottle to axially retain the tamper evident band 203. In other words, the retaining elements 213 act to substantially prevent the tamper evident band 203 from moving parallelly with respect to the longitudinal axis A when the capsule 200 is unscrewed from the mouth during the first opening of the container, and thereby promoting the breakage of the connecting elements 201, thus allowing for separation of the tamper evident band 203 from the cup-shaped body 210.

The measuring apparatus 1 is arranged to measure the pull-off force of the connecting elements 201 by simulating the actions performed by a user when he or she opens a bottle for the first time yet without unscrewing the capsule 200.

Indeed, the capsule 200 is tested in the measuring apparatus 1 by subjecting it to a tensile force, as will be better explained hereafter in the description.

The measuring apparatus 1 comprises a frame 2 restingly arranged on a resting plane 3 (FIG. 3), e.g., a floor of a laboratory or of a plant for the fabrication of capsules 200 for closing containers. The frame 2 is provided with a support arrangement 4 through which the measuring apparatus 1 rests on the resting plane 3. The support arrangement 4 may comprise a plurality of legs 5 and feet 6, each foot 6 being connected to a respective leg, on one side, and to the resting plane 3, on the other side.

Figure 2:
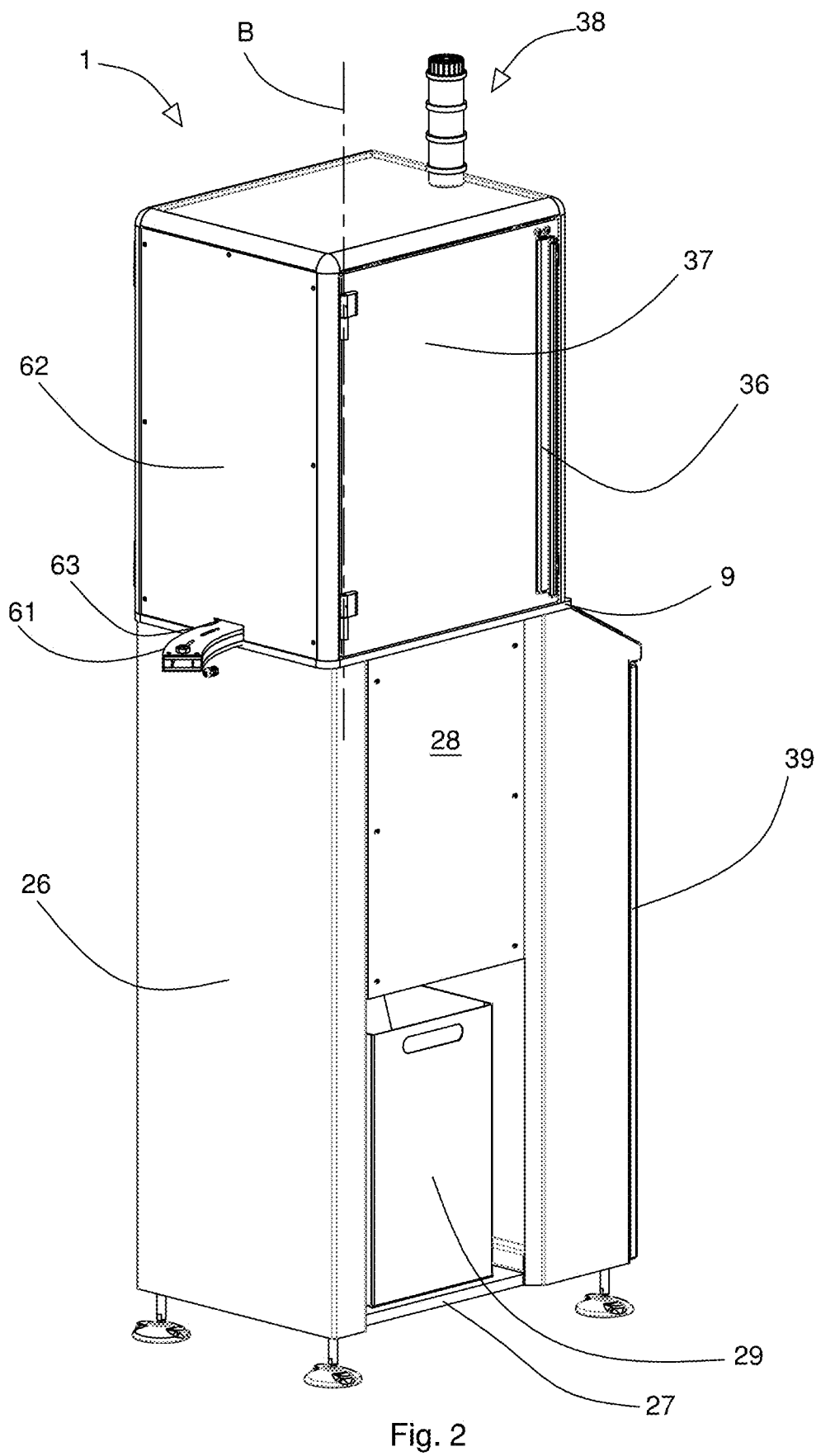
FIG. 2 is a further perspective view of the measuring apparatus in FIG. 1, showing a rear part of the measuring apparatus.
Figure 3:
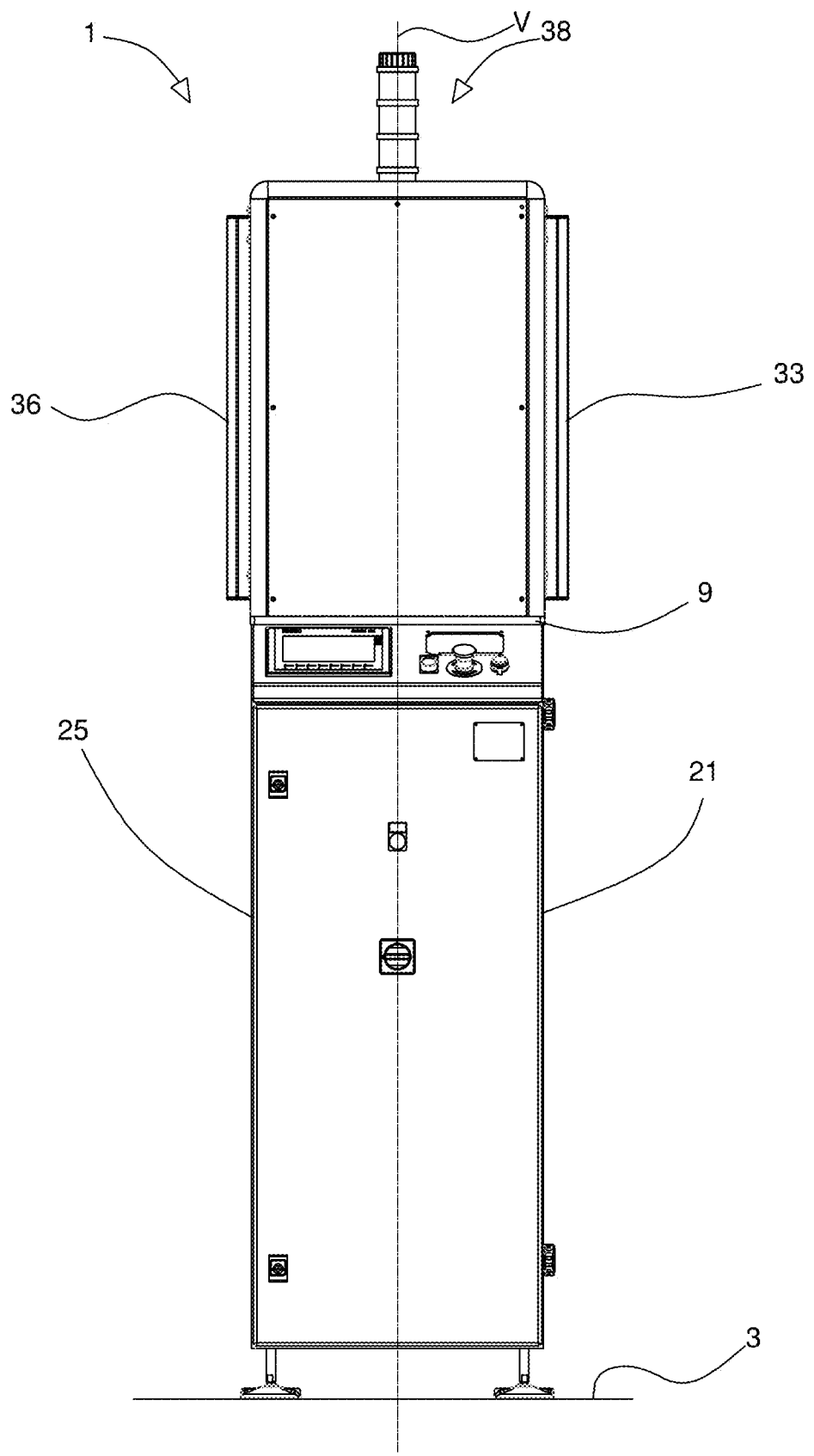
FIG. 3 is a front view of the measuring apparatus in FIG. 1.

With particular reference to FIGS. 1, 2 and 3, the frame 2 comprises a lower part 7, mounted on the support arrangement 4, and an upper part 8, mounted farther from the resting plane 3 than the lower part 7.

The lower 7 and upper parts 8 are separated by a support plate 9 mounted on an upper edge of the lower part 7.

The measuring apparatus 1 comprises a control panel 10 mounted on an upper wall 11 of the lower part 7, which is in particular inclined to a vertical axis V of the measuring apparatus 1 (FIG. 3), such vertical axis V being substantially perpendicular to the resting plane 3.

The control panel 10 is arranged to allow an operator to interact with the measuring apparatus 1. For example, the operator may operate components of the measuring apparatus 1 through the control panel 10. To this end, the control panel 10 comprises an interface panel 12, especially of the touch-screen type, comprising a displaying device 13, such as a display, on which a graphical interface may be implemented, through which the operator interacts with components of the measuring apparatus 1.

The control panel 10 may further comprise an additional interface panel 14, especially of the touch-screen type, provided with an additional displaying device 15, such as a display, on which an additional graphical interface may be implemented, through which the operator interacts with additional components of the measuring apparatus 1, e.g., a force sensor of the measuring apparatus 1, as better explained hereafter in the description.

The control panel 10 may further comprise a push button arrangement 16 comprising a plurality of push buttons, in particular of the mechanical type. For example, a mushroom head button may be provided that may be operated if the measuring apparatus 1 experiences an emergency condition, e.g., if one or more components of the measuring apparatus do not function properly, or in case of maintenance intervention to be carried out on the components of the measuring apparatus 1 and/or a reset button to be operated following an emergency condition.

The control panel 10 may further comprise a force sensor connecting socket 17. The connecting socket 17 may be formed to receive an electronic device of the USB type, adapted to store data detected by the force sensor.

The lower part 7 of the frame 2 further comprises a front wall 18 to which a main power switch 19 of the measuring apparatus 1 may be mounted, which may be operated to apply voltage to the electrical/electronic components of the measuring apparatus 1, namely to supply power thereto.

Moreover, an indicator light 20 may be mounted to the front part 18, indicating that the electrical/electronic components of the measuring apparatus 1 are connected to a power supply.

The lower part 7 of the frame 2 further comprises a first side wall 21 provided with an openable panel 22 in particular hinged along an edge 23 through at least one hinge 24 so as to be rotatable around a rotation axis R.

Finally, the lower part 7 of the frame 2 comprises a second side part 25, opposite to the first side wall 21, a rear wall 26, opposite to the upper wall 11 and to the front wall 18, and a bottom wall 27 opposite to the support plate 9.

An additional openable panel 39, similar to the openable panel 22, may be provided on the second side part 25.

The upper wall 11, the front wall 18, the first side wall 21, the second side part 25, the rear wall 26, the bottom wall 27 and the support plate 9 define a chamber 28 arranged to house some electronic/electrical components of the measuring apparatus 1.

A container 29 may be arranged on the bottom wall 27, which is suitable to receive, especially by gravity, the capsules 200 subjected to a tensile force in the measuring apparatus 1 during use.

The upper part 8 comprises a substantially open box-shaped casing 30 on a side mounted on the support plate 9.

The casing 30 acts as a physical barrier adapted to protect an operator coming in proximity to the measuring apparatus 1 and thus exposed to a risk of projection and contact with moving parts of the measuring apparatus 1.

The casing 30 and the support plate 9 delimit a housing 31 arranged to house some electronic/electrical/mechanical components of the measuring apparatus 1, as well as a working area of the measuring apparatus 1.

The casing 30 may be made of a transparent plastic material (FIG. 4), so as to enable an operator to see the moving parts of the measuring apparatus 1 functioning.

At one side 32 of the casing 30 is provided a door 33 in particular hinged along an additional edge 34 through an additional hinge 35 so as to be rotatable around a rotation axis B thereof in order to allow an operator to access the moving parts of the measuring apparatus 1, for example to carry out maintenance thereon.

An additional door 36, similar to door 33, may be provided on an additional side 37 of the casing 30.

The measuring apparatus 1 may comprise a status indicator arrangement 38 mounted on the frame 2, in particular at the top of the upper part 8, and intended for displaying to the operator a status of the measuring apparatus 1. For example, the status indicator arrangement 38 comprises one or more light sources, the color of the light emitted thereby defining a status of the measuring apparatus 1. In particular, a red colored light may be associated with an emergency status of the measuring apparatus 1, for example caused by a malfunctioning of one or more components of the measuring apparatus 1, whereas a green colored light may be associated with an operating status of the measuring apparatus 1, that is, when the measuring apparatus 1 functions properly.

Figure 4:
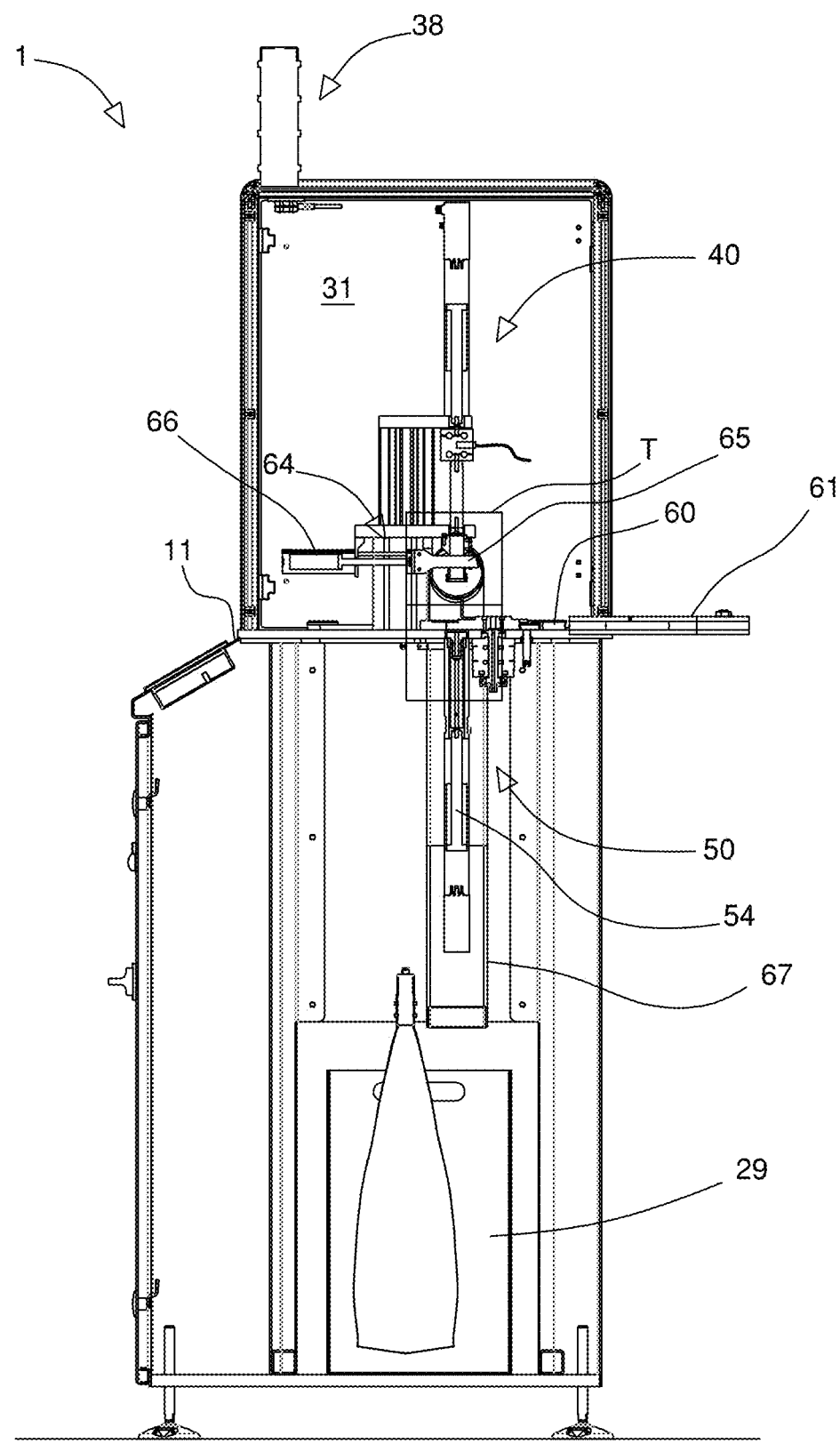
FIG. 4 is a section of the measuring apparatus in FIG. 1, taken along the vertical section plane IV-IV in FIG. 3.
Figure 4A:
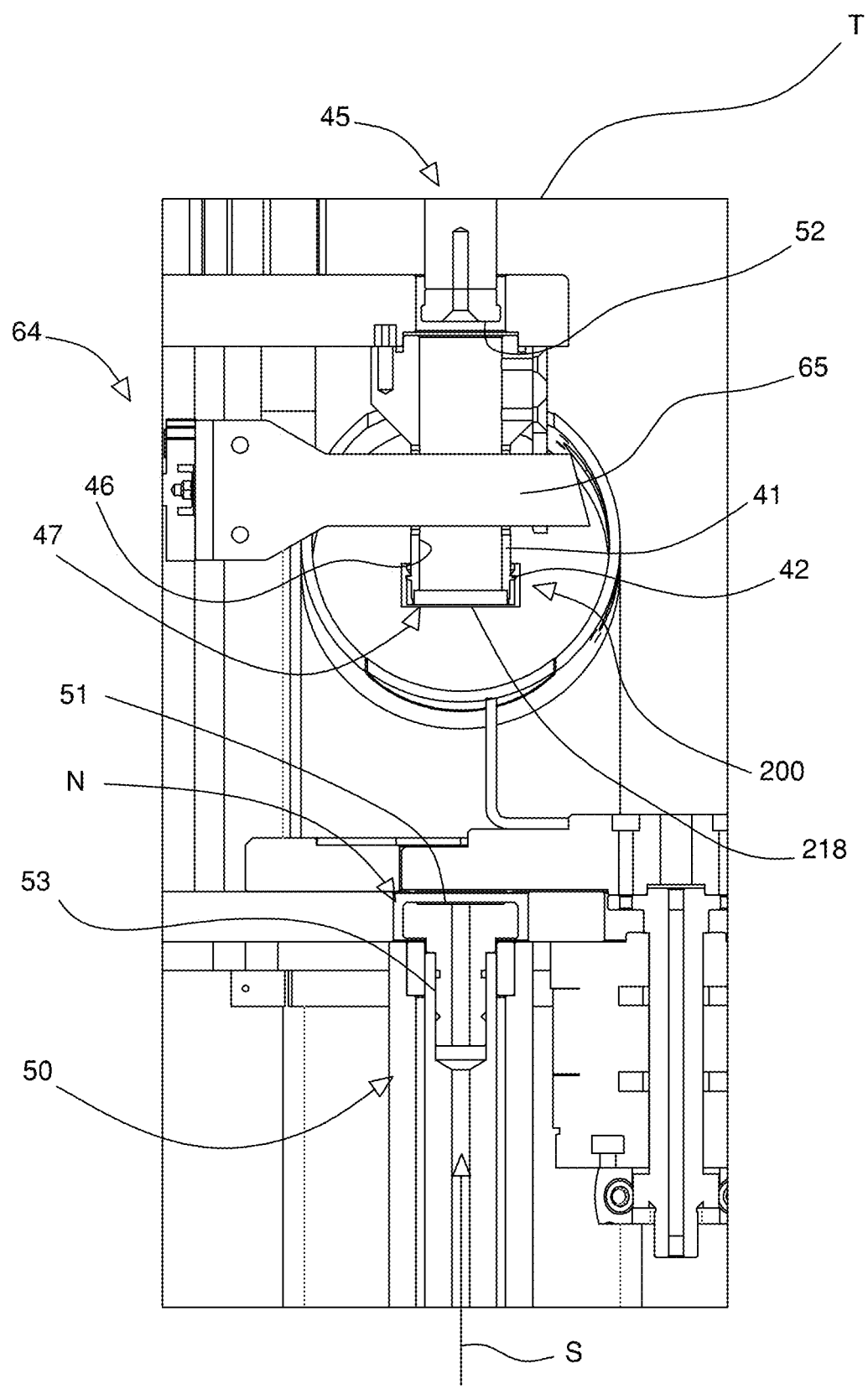
FIG. 4a shows an enlarged detail T in FIG. 4.
Figure 5:
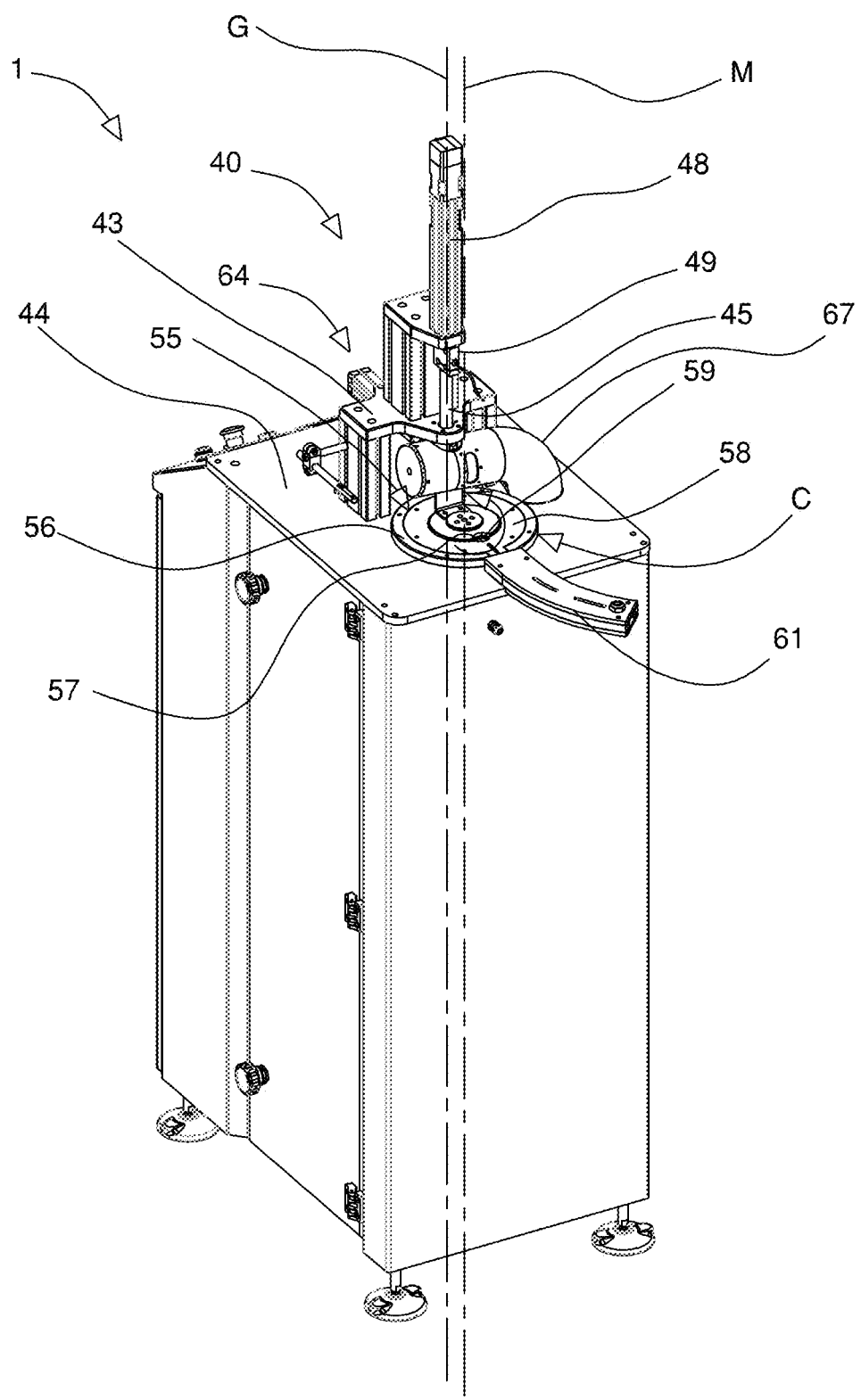
FIG. 5 shows a still further perspective view of the measuring apparatus in FIG. 1, with a cover removed to show a force detection unit of the measuring apparatus in FIG. 1.

With particular reference to FIGS. 4, 4a and 5, the measuring apparatus 1 further comprises a detection unit 40 arranged to obtain the pull-off force of the connecting elements 201 by measuring a plurality of values of the tensile force, to which the capsule 200 is subjected, by means of the detection unit 40 itself.

The detection unit 40 comprises a hollow gripping spindle 41 provided with a ridge 42, in particular annular in shape, to which the capsule 200 to be subjected to a tensile force is connectable.

In use, the ridge 42 is configured to interact with the retaining elements 213 of the capsule 200 to axially retain the tamper evident band 203 of the capsule 200 and thus the capsule 200 itself.

The hollow gripping spindle 41, to which the tamper evident band 203 of the capsule 200 connects, simulates the grip provided by the neck of a bottle to which the capsule 200 may be mounted.

The hollow gripping spindle 41 is substantially tubular in shape.

In use, the capsule 200 is connected at an end part 47 of the hollow gripping spindle 41.

The hollow gripping spindle 41 is fixed to a support structure 43 of the detection unit 40 (shown for example in FIG. 5), which is mounted on a portion of a face 44 of the support plate 9.

The support structure 43, for example, has a portal-type shape, and is made of a metal material such as aluminum, for example.

The face 44 defines a worktop of the detection unit 40.

The detection unit 40 further comprises a pusher device 45 arranged to interact with at least one portion of an inner surface of the capsule 200.

The inner surface of the capsule 200 may have a flat surface or be substantially L-shaped.

The inner surface of the capsule 200 may comprise the bottom surface 214 of the end wall 204 and/or the inner seal surface 215 of the seal element 207.

The pusher device 45 are movable along a breakage direction D, and are arranged to move from the top down, namely for approaching the resting plane 3, in order to apply a force to the capsule 200, especially on at least one portion of the inner surface of the capsule 200, so as to cause the breakage of the connecting elements 201 of the capsule 200, when the capsule 200 is mounted to the hollow gripping spindle 41.

The breakage direction D, indicated by an arrow in FIGS. 4, 7, 8 and 9, is substantially parallel to the vertical axis V of the measuring apparatus 1, and substantially perpendicular to the face 44 of the support plate 9.

The pusher device 45 are movable along the breakage direction D by a movement device 48, such as an actuator, namely a linear one, to which the pusher device 45 are connected. The movement device 48 is mounted to the support structure 43 of the detection unit 40.

In use, the pusher device 45 are formed to slide within a longitudinal cavity obtained inside the hollow gripping spindle 41 to stop, and push, against at least one portion of the inner surface of the capsule 200.

After that, the pusher device 45 continue their stroke past the end part 47 of the hollow gripping spindle 41 to fracture, sequentially, all bridge elements 201a and then the one or more tether elements 201b with which the capsule 200 to be tested is provided.

The detection unit 40 further comprises a sensor arrangement 49, associated with the pusher device 45, to detect values of the force which the pusher device 45 applies to at least one portion of the inner surface of the capsule 200, and, as a result, to the connecting elements 201, during the movement along the breakage direction D.

The sensor arrangement 49 are configured in particular to detect a measured signal, in particular an electrical one, e.g., a tension or force value, proportional to the deformation which the force applied by the pusher device 45 produces on the connecting elements 201 of the capsule 200.

When the electrical measured signal is not a force value, but rather a tension value, for example, a processing and control unit of the measuring apparatus 1 translates it into a force value.

Specifically, the sensor arrangement 49 detect a plurality of force values of the tensile force to which the connecting elements 201 are subjected, each force value being associated with a movement of the pusher device 45 along the breakage direction D.

The sensor arrangement 49 may comprise a force sensor, a pressure sensor or an electrical power sensor.

For example, the sensor arrangement 49 comprises a load cell.

Simultaneously with the movement of the pusher device 45 along the breakage direction D, the sensor arrangement 49 detect the values of the force applied on the capsule 200, and possibly store them in a memory of the processing and control unit of the measuring apparatus 1.

The plurality of force values detected may be transferred to an electronic memory device of the USB type by inserting an end of the latter into the connecting socket 17.

Additionally, or alternatively, the plurality of force values detected may be automatically transferred to a main controller (PLC) of the capsule processing line, for example through an Ethernet cable.

In an example, the pusher device 45 comprises a pusher substantially cylindrical in shape.

The capsule 200 to be tested is supplied to the detection unit 40 manually or by means of a lifting and abutting device 50 of the measuring apparatus 1.

The lifting and abutting device 50 is provided with an abutting surface 51 arranged to restingly receive an area of an outer surface 218 of the end wall 204 of the capsule 200, and is further arranged to push the area of the outer surface 218 of the end wall 204 along a supply direction S, indicated by an arrow in FIGS. 4, 6, 9 and 10, so as to supply the capsule 200 to the detection unit 40.

The supply direction S is substantially perpendicular to the resting plane 3 and to the face 44 of the support plate 9. Specifically, in use, the lifting and abutting device 50 is moved along the supply direction S until the retaining elements 213 are engaged with the ridge 42, and thereby the capsule 200 is retained on the hollow gripping spindle 41.

In order to supply a capsule 200 to the detection unit 40, the lifting and abutting device 50 is movable, in particular, between a lowered, non-operating position N, shown in FIGS. 4 and 4a, in which the abutting surface 51 is positioned below the face 44, and a supply position P, shown in FIGS. 6 and 10, in which the abutting surface is positioned above the face 44, and at a distance from the latter, such that the connection of the capsule 200 to the ridge is guaranteed.

In the supply position P, the abutting surface 51 may be deviated from the end part 47 by the thickness of the end wall 204 or by the thickness of the end wall 204 and of the seal element 207, if present, these thicknesses being measured along a direction substantially parallel to the longitudinal axis A of the capsule 200.

The lowered position N and the supply position P are at opposite ends of the stroke of the lifting and abutting device 50.

The abutting surface 51 is obtained at an end of the lifting and abutting device 50, and may be flat.

In use, the abutting surface 51 is further arranged to cooperate with at least one area of the outer surface 218 of the end wall 204 in order to limit or avoid a tipping of the capsule 200 during the application of the tensile force to break the connecting elements 201, in case the capsule 200 tips over, namely in case it tilts with respect to its longitudinal axis A (taken on when the capsule 200 is mounted on the hollow gripping spindle 41) or with respect to a longitudinal axis G of the cavity 46 of the hollow gripping spindle 41, the tensile force being applied after the connection of the capsule 200 to the ridge 42 of the hollow gripping spindle 41.

In use, in order to limit or avoid a tipping of the capsule 200 after the connection of a capsule 200 to the end part 47 of the hollow gripping spindle 41, the lifting and abutting device 50 is operated to travel a set portion (FIGS. 7 and 12) along an operating direction O, such that between the abutting surface 51 and the outer surface 218 (or the thrust surface 52) is maintained a set distance X corresponding to the length of the set portion as measured along the operating direction O.

The set distance X may range between 0.5 mm and 1 mm.

The operating direction O may have at least one component substantially parallel and opposite to the supply direction S moving away from the outer surface 218 of the end wall 204, namely approaching the face 44 and the resting plane 3.

The operating direction O may further comprise at least one component substantially parallel to, and concordant with, the breakage direction D.

When the pusher device 45 move along the breakage direction D and apply at the same time a force to the capsule 200, the lifting and abutting device 50 moves along the operating direction O so as to maintain the set distance equal to the length of the set distance X in a first portion, specifically until all bridge elements 201a have been fractured. For example, this condition may occur when the values of the force applied by the pusher device 45 and measured by the sensor arrangement 49 start decreasing after having reached a maximum value. In other words, along the first portion, the abutting surface 51 of the lifting and abutting device 50, and a thrust surface 52 of the pusher device 45 do not move by relative motion, but are stationary with respect to each other, since they move simultaneously, notably substantially at the same speed.

The lifting and abutting device 50 then travels a further portion along the operating direction O, and the pusher device 45 are operated along the breakage direction D in order to interact with the inner surface of the capsule 200 to fracture the tether elements 201b, if present. In this case, too, a further set distance Y is maintained, this corresponding for example to the set distance X between the abutting surface 51 and the outer surface 218 of the end wall 204 (or of the thrust surface 52) for a second travel portion of the lifting and abutting device 50 (subsequent to the further portion) and of the pusher device 45, namely until all tether elements 201b have been fractured. For example, this condition may occur when the values of the force applied by the pusher device 45 and measured by the sensor arrangement 49 start decreasing after having reached a maximum value. In other words, along the second portion, too, the abutting surface 51 of the lifting and abutting device 50, and the thrust surface 52 of the pusher device 45 do not move by relative motion, but are stationary with respect to each other, since they move simultaneously, notably substantially at the same speed.

When the capsule 200 tips over, namely when the capsule 200 tilts with respect to the longitudinal axis G of the longitudinal cavity 46 of the hollow gripping spindle 41, the set distance X between the abutting surface 51 and the surface 214 is not maintained, since through the rotation of the capsule 200 and, as a result, of the end wall 204, an area of the outer surface 218 extends beyond the position which would usually be assumed if the end wall 204 remained substantially perpendicular to the longitudinal axis of the longitudinal cavity 46 of the hollow gripping spindle 41. As such, the abutting surface 51 may abut on an area of the external surface 218, thus preventing an excessive rotation of the capsule 200, which occurs when the plane on which the thrust surface 52 lies, and the plane on which the end wall 204 lies enclose an angle, especially greater than 75°.

A tilting of the capsule 200 occurs when not all bridge elements 201a are fractured substantially at the same time, and when once all bridge elements 201a are fractured, the tamper evident band 203 remains anchored to the side wall 202 by means of the tether elements 201b. An excessive rotation of the capsule 200 would imply that the pusher device 45 fails to abut on the inner surface of the capsule 200, and, therefore, that the connecting elements 201 fail to break.

The set distance X and the further distance are selected so as to guarantee that the abutting surface 51 cooperates with the outer surface 218 of the end wall 204 of the capsule 200.

Owing to the lifting and abutting device 50 it is therefore guaranteed a reliable measurement of the force applied to the connecting elements 201 of the capsule 200 to be tested, namely to be subjected to a strain, since a tilting of the capsule 200 in the absence of the abutting surface 51 is limited or avoided. This guarantees that all connecting elements 201 are subjected first to a tensile force and then to a pull-off force.

The lifting and abutting device 50 comprises a lifting element 53, in particular cylindrical in shape, e.g., a piston, and a drive device 54, of the known type, e.g., a linear actuator, arranged to move the lifting element 53 alternatively along a supply direction S or along the operating direction O.

The measuring apparatus 1 may further comprise a capsule positioning device 55 arranged for positioning a capsule 200 to be tested, above the abutting surface 51, when the lifting and abutting device 50 is in the lowered position N.

The capsule positioning device 55 comprises a rotating disc 56 rotatable around a rotation axis M thereof, and mounted to the face 44 of the support plate 9.

The rotating disc 56 is provided with a seat 57 shaped to house a capsule 200 to be tested, with the open end 206 facing upwards, that is with the closed end 205 facing towards the resting plane 3. The size of the seat 57 is selected so that the capsule 200 does not move, or moves with a limited clearance, within the seat 57 itself during the rotation of the rotating disc 56, and this to allow for its optimal positioning above the abutting surface 51.

The rotating disc 56 may further comprise an inlet channel 60 having a first end that is located within the seat 57, arranged to receive a capsule 200 to be tested, and to supply it to the seat 57, and a second end, opposite to the first end of the inlet channel 60, provided with an inlet for the capsule 200 to be tested.

In use, the capsule 200 is inserted into the inlet of the inlet channel 60 and slips on a bottom of the inlet channel 60 until it reaches the seat 57.

The capsule positioning device 55 may further comprise a cover 58, removably mounted on the rotating disc 56, in which a through opening 59 may be obtained, which allows to see the capsule 200 when it is inserted into the seat 57, during the rotation of the rotating disc 56.

In use, the rotating disc 56 is rotatable around the rotation axis M, specifically in the direction indicated by the arrow in FIG. 5, between a receiving position C, shown in FIG. 5, in which the seat 57 faces the first end of the inlet channel 60, and a removing position, not shown in the Figures, in which the seat 57 is substantially coaxial with the hollow gripping spindle 41. In this manner, the capsule 200 will have its longitudinal axis A substantially parallel to, and especially coinciding with, the longitudinal axis G of the longitudinal cavity 46 of the hollow gripping spindle 41.

The removing position may be located diametrically opposite to the receiving position C.

The capsule 200 may be supplied to the rotating disc 56 manually, by inserting it into the inlet channel 60 or directly into the seat 57, or it may be supplied to the rotating disc 56 through a capsule supplying guide 61 connecting the measuring apparatus 1 to a portion of the plug processing line provided in the capsule production plant, specifically downstream of a cutting machine adapted to engrave capsules 200, especially adapted to cut the side wall 202 of a capsule 200, such that the tamper evident band 203 and one or more connecting elements 201 are obtained on said side wall 202.

Indeed, the capsule supplying guide 61 may be connected to the inlet channel 60 (at the second end) or to the seat 57, in the absence of an inlet channel 60, on one side, and, on the other side, to the portion of the capsule processing line, close to which is provided a deflector device comprising, for example, a rotatable rod arranged to interact with a capsule 200 passing along the line portion to deflect its path along the supplying guide 61 and then to the capsule positioning device 55.

The capsule supplying guide 61 is partially mounted on the face 44. In a panel of the casing 30, specifically a rear panel 62 of the upper part 8, a through-hole 63 is obtained to enable the mounting of the capsule supplying guide 61 on the face 44.

The capsule supplying guide 61 may be polygonal in section.

When the measuring apparatus 1 comprises the capsule supplying guide 61, a capsule 200 to be tested may be automatically removed from the processing line. Owing to the capsule supplying guide 61, therefore, the measuring apparatus 1 may form part of the capsule processing line 200.

Either an individual capsule 200 or a group of capsules 200 to be tested sequentially in the measuring apparatus may be automatically removed from the processing line. For example, the number of capsules 200 of the group of capsules 200 may coincide with the number of spindles in the cutting machine. The number of capsules 200 removed from the supply line may be programmed by the processing and control unit, which can talk to a main controller (PLC) of the capsule processing line.

Alternatively, the measuring apparatus 1 may be used in stand-alone fashion, namely detached from the plug processing line. In such case, the measuring apparatus 1 is employed as a laboratory machine for testing the pull-off force of the connecting elements 201.

The measuring apparatus 1 further comprises a cutting device 64 arranged to cut the portion of tamper evident band 203 remaining attached to the ridge 42 at the end of the measurement of the pull-off force of the connecting elements 201, namely when all connecting elements 201 have been fractured.

The cutting device 64 comprises a knife 65 (FIGS. 4 and 4a), and an actuator device 66 (FIGS. 4 and 5), for example a linear actuator, arranged to move the knife for approaching the portion of the tamper evident band 203 to perform a cross-cut, namely a cut not perpendicular to the vertical axis V of the measuring apparatus 1, such that the portion of the tamper evident band 203 separates from the hollow gripping spindle 41.

Once the portion of the tamper evident band 203 has been separated from the gripping spindle 41, an air blow generated, for example, by a nozzle attached to a compressed air channel, not shown in the Figures, directs the capsule 200 (cup-shaped body 210 and tamper evident band 203) to a discharge pipe 67 having an end located above the container 29 (FIG. 4). The discharge pipe 67 is formed such that the tested capsule 200 falls by gravity into the container 29, possibly interacting with portions of an inner surface of the discharge pipe 67 itself.

Owing to the air blow, the tested capsule 200 is automatically ejected out of the detection unit 40.

Figure 6:
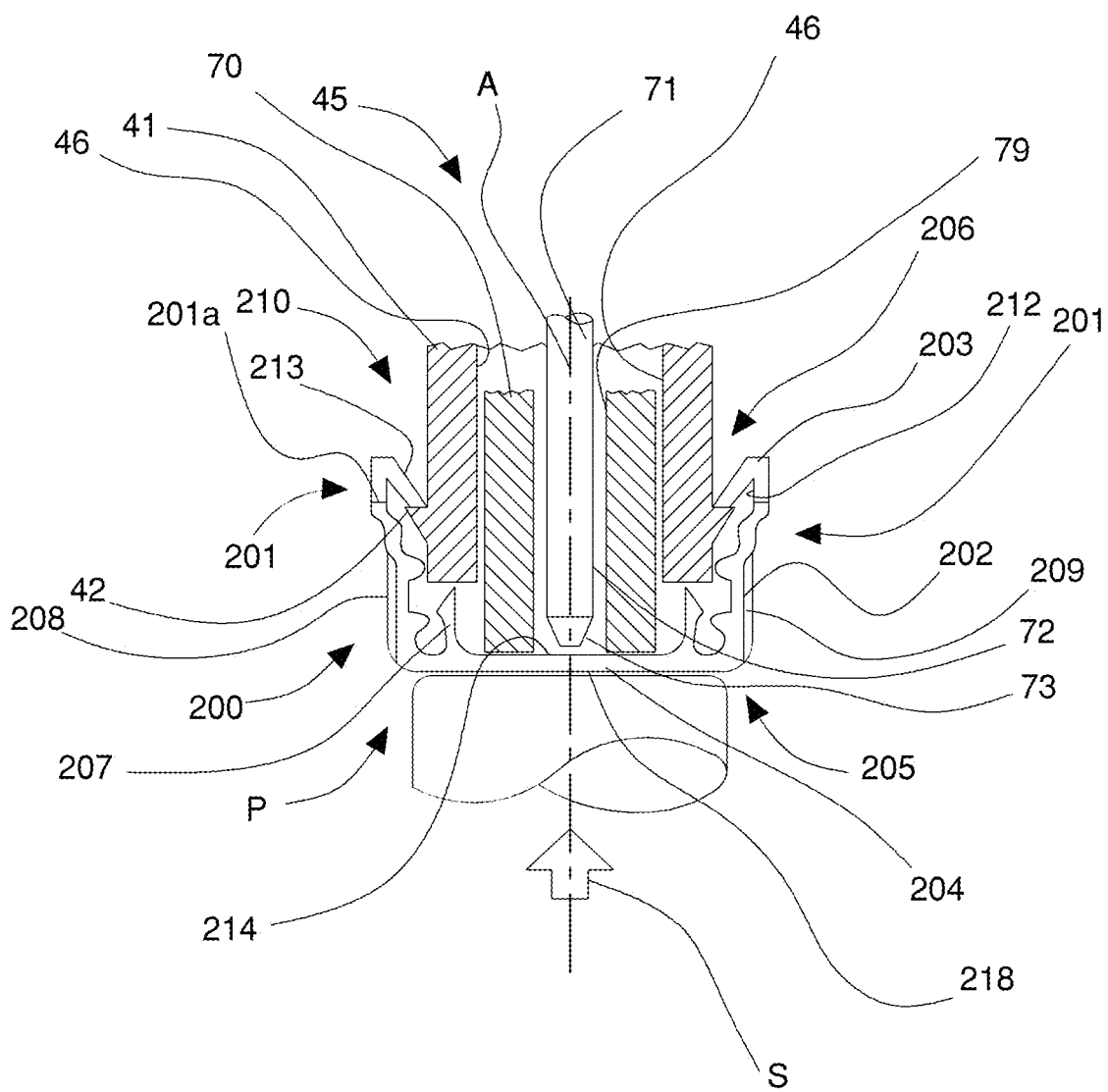
FIGS. 6-8 are sectional views of a portion of the force detection unit, according to a first exemplary embodiment of the measuring apparatus, and of a capsule subjected to a tensile force to measure the pull-off force of connecting elements of the capsule, such views showing steps of a first exemplary sequence for detecting the pull-off force of the connecting elements.
Figure 7:
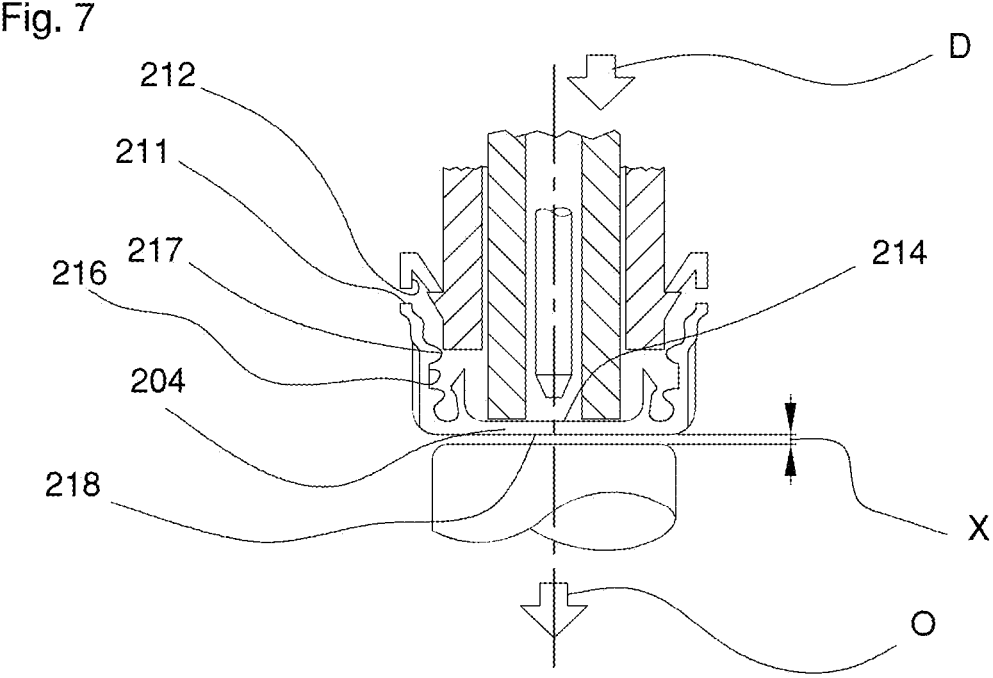
Figure 8:
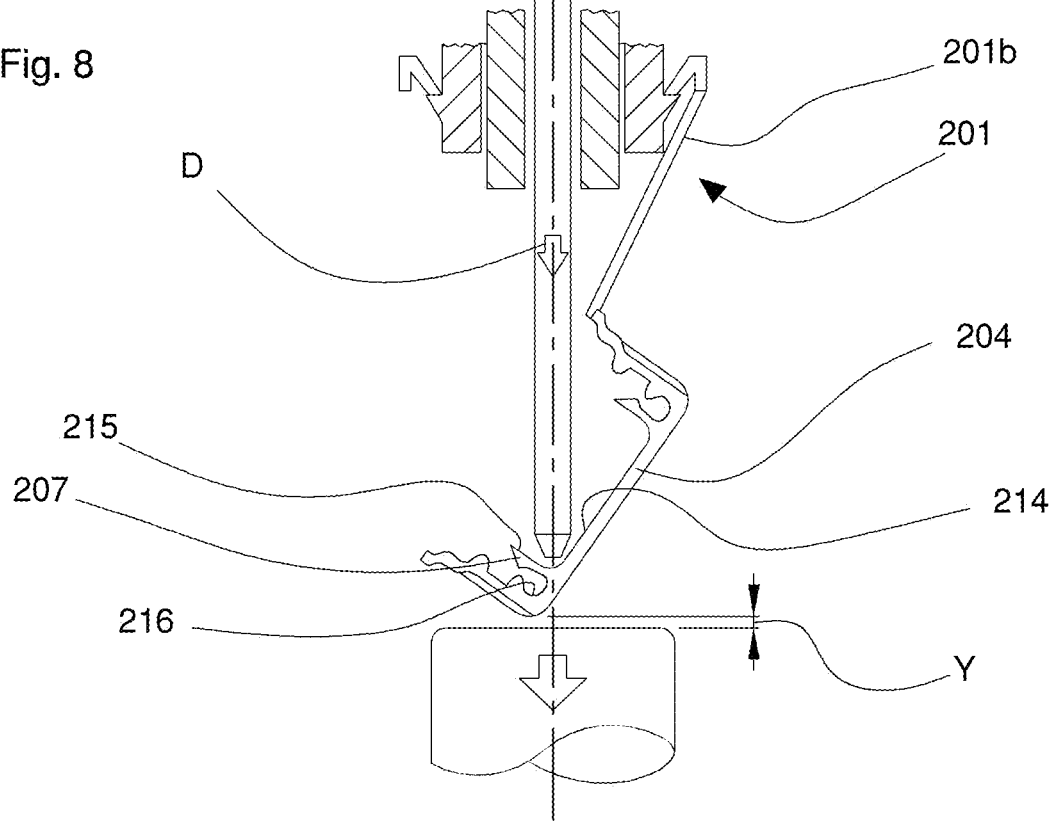

With particular reference to FIGS. 6-8 showing a portion of the force detection unit 40 according to a first exemplary embodiment of the measuring apparatus 1 and to some steps of a first example of a sequence for detecting the pull-off force of the connecting elements 201, the pusher device 45 comprises a first pusher 70 and a second pusher 71 arranged coaxially, and configured to detect the pull-off force of the bridge elements 201a and of the tether elements 201b, respectively, when they are moved along the breakage direction D by means of a first actuator of the movement device 48 and of an additional actuator of the movement device 48, respectively.

The first pusher 70 is shaped substantially as a hollow cylinder, with the second pusher 71 being slidable therein. Specifically, a longitudinal opening 79 is obtained in the first pusher 70, the second pusher 71 being slidable therein.

The second pusher 71 comprises a shaft 72 having a substantially cylindrical shape and a tapered end 73, especially with a blunt tip, coupled with an end of the shaft 72.

In this first exemplary embodiment, the thrust surface 52 of the pusher device 45 comprises the thrust surface of the first pusher 70, which, in use, is intended for pushing against a portion of the bottom surface 214 of the end wall 204 (FIGS. 6 and 7). The thrust surface 52 of the pusher device 45 further comprises the thrust surface of the second pusher 71, obtained on the tapered end 73, which, in use, is intended for pushing against a portion of the bottom surface 214 of the end wall 204 (FIG. 8) as well as against a portion of the inner seal surface 215 of the seal element 207, when the seal element 207 is present, or against a portion of the inner side surface 216 of the side wall 202, when no seal element 207 is provided in the capsule 200. The tapered end 73 of the second pusher 71 is shaped so as to engage, and push against, an L-shaped portion of the inner surface, a side thereof being arranged on the bottom surface 214 and the other side thereof being arranged on the inner seal surface 215 or on the inner side surface 216.

In this first exemplary embodiment, the sensor arrangement 49 comprises a first force sensor, such as a load cell, connected to the first pusher 70, and a second force sensor, such as a load cell, connected to the second pusher 71, in order to detect values of the force applied to the bridge elements 201a and to the tether elements 201b, respectively, of the capsule 200 when subjected to a tensile force.

With particular reference to FIGS. 9, 10, 12 and 13, showing a portion of the force detection unit 40 according to a second exemplary embodiment of the measuring apparatus 1 and to some steps of a second example of a sequence for detecting the pull-off force of the connecting elements, the pusher device 45 comprises a first portion 74, substantially cylindrical in shape, and a second portion 75, also cylindrical in shape, hinged on the first portion 74 so as to be rotatable around a hinge axis H substantially perpendicular to the longitudinal axis G of the longitudinal cavity 46 of the hollow gripping spindle 41. In other words, the second portion 75 is articulated with respect to the first portion 74.

Figure 9:
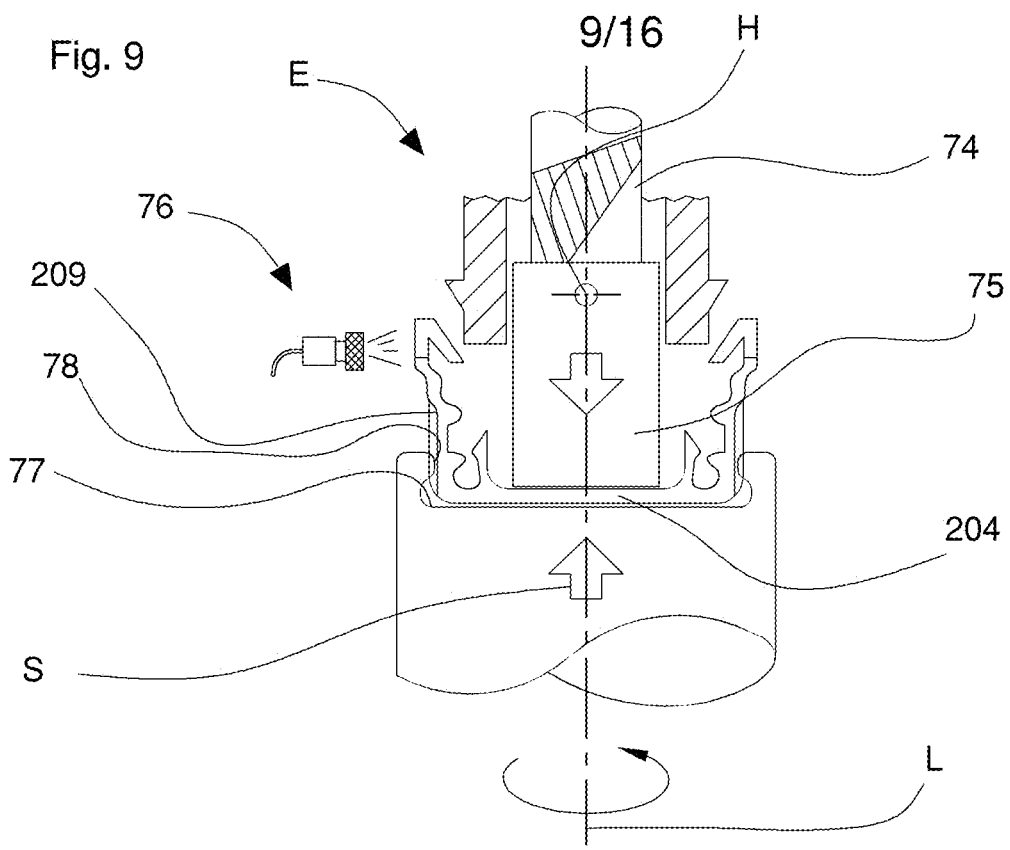
FIGS. 9-10 are sectional views of a portion of the force detection unit, according to a second exemplary embodiment of the measuring apparatus, of a capsule subjected to a tensile force to measure the pull-off force of connecting elements of the capsule, and of a vision system adapted to detect features of the capsule, such views showing steps of a second exemplary sequence for detecting the pull-off force of the connecting elements.
Figure 10:
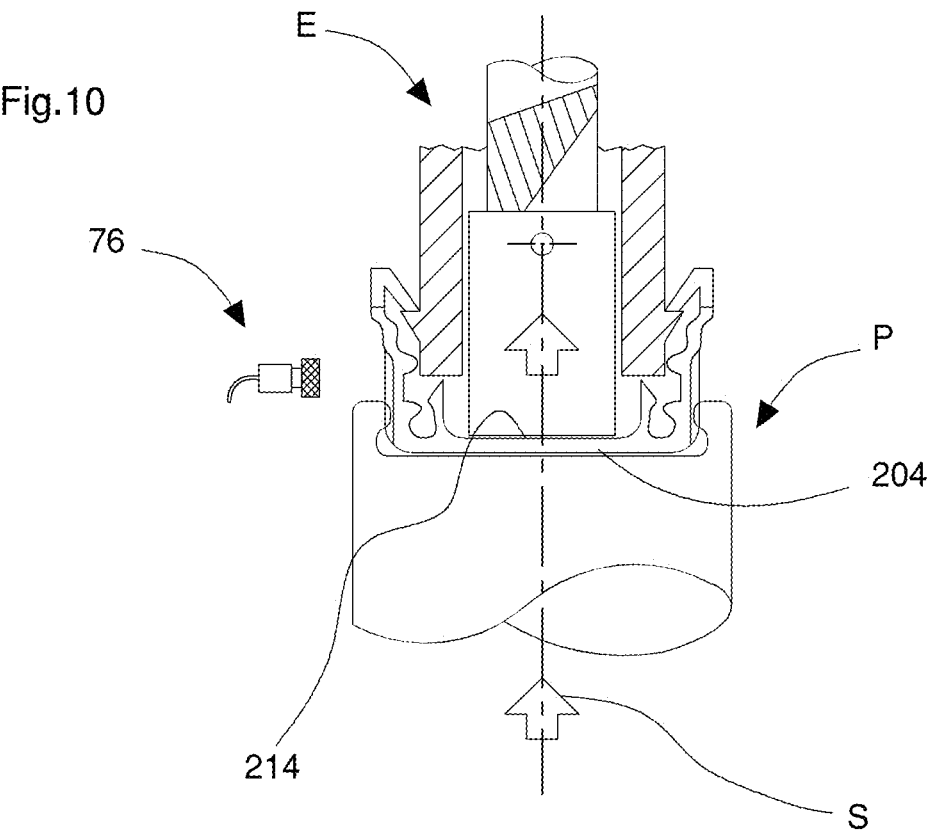
Figure 12:
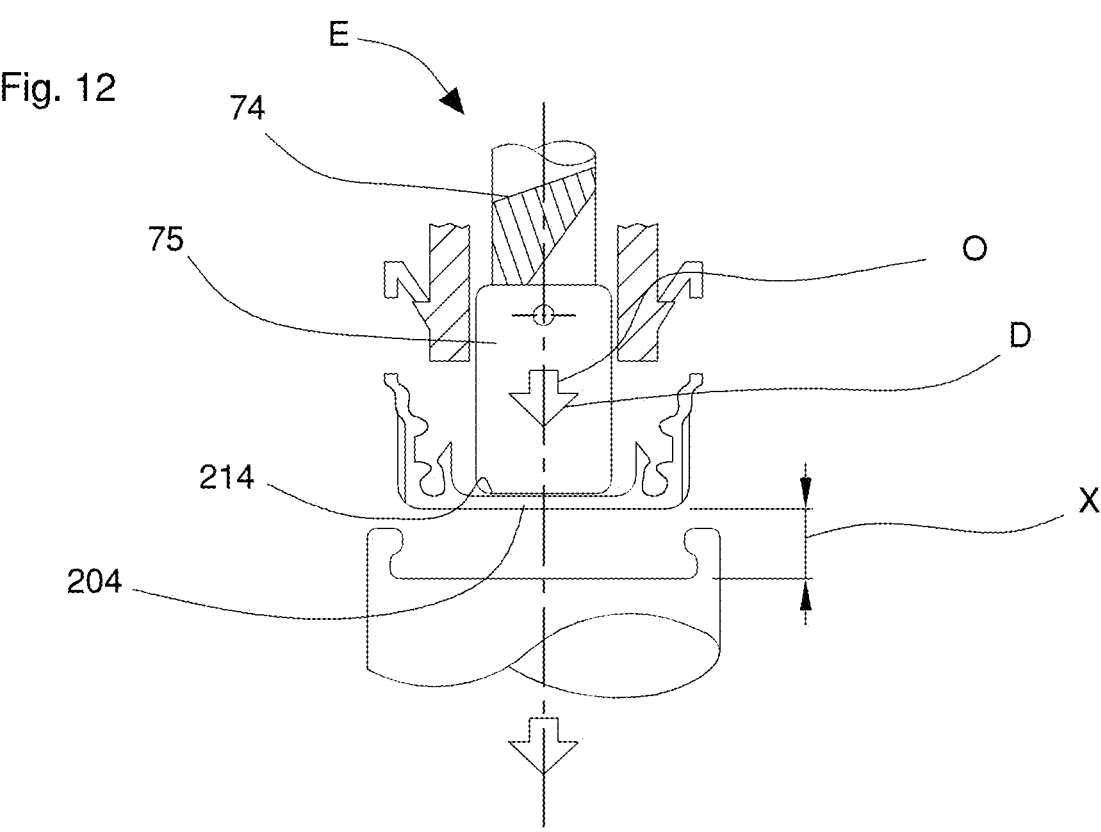
FIGS. 12-13 are sectional views of a portion of the force detection unit, according to a third example, and of a capsule subjected to a tensile force in order to test the pull-off force of the connecting elements of the capsule, such views showing steps of a third exemplary sequence for detecting the pull-off force of the connecting elements.

In use, the first portion 74 and the second portion 75 initially assume an aligned configuration E, especially shown in FIGS. 9, 10 and 12, in which the first portion 74 and the second portion 75 are aligned along an axis substantially parallel to, or coinciding with, the longitudinal axis G of the longitudinal cavity 46 when the measuring apparatus 1 is not operating, or to push a portion of the bottom surface 214 of the end wall 204 in order to first deform and then fracture the bridge elements 201a (FIG. 12) by moving the pusher device 45 along the breakage direction D. Simultaneously with the movement of the pusher device 45 along the breakage direction D, the sensor arrangement 49 detect and possibly store in the memory the values of the force applied on the capsule 200.

At the time when all the bridge elements are broken 201a (coinciding with a decrease in the force values detected), the pusher device 45 is operated again along the breakage direction D, and by continuing its stroke along the breakage direction D, an end portion of the second portion 75 engages a portion of the bottom surface 214 of the end wall 204 and a portion of the inner seal surface 215 of the seal element 207 (or a portion of the inner side surface 216 when the seal element 207 is not present), such portions tilting with respect to the longitudinal axis A of the capsule 200 (when the capsule 200 is mounted on the hollow gripping spindle 41), or to the longitudinal axis G of the cavity 46 of the hollow gripping spindle 41, since the at least one tether element 201b keeps the tamper evident band 203 anchored to the hollow gripping spindle 41 on one side, and drags in rotation the second portion 75. In other words, the second portion 75 rotates around the hinge axis H. By contrast, the first portion 74 does not rotate, but remains with its longitudinal axis substantially parallel to the longitudinal axis G of the cavity 46 of the hollow gripping spindle 41. Therefore, the first portion 74 and the second portion 75 assume an inclined configuration F in which the second portion 75 has a longitudinal axis which is no longer aligned but inclined with respect to that of the first portion 74. When the second portion 75 goes down, it keeps on applying a force to the inner side of the capsule 200, thereby leading to the breakage of the at least one tether element 201b, too. Simultaneously with the movement of the pusher device 45 along the breakage direction D, the sensor arrangement 49 detect and possibly store in the memory the values of the force applied to the capsule 200.

Also in this case, the end portion of the second portion 75 is shaped so as to engage, and push against, an L-shaped portion of the inner surface, a side thereof being arranged on the bottom surface 214 and the other side thereof being arranged on the inner seal surface 215 or on the inner side surface 216.

In this second embodiment, the measuring apparatus 1 comprises a vision system 76 arranged to acquire an image of the capsule 200 to be tested, namely an image of the tamper evident band 203 prior to its separation from the side wall 202 when the capsule 200 is subjected to a tensile test, specifically prior to the connection of the capsule 200 to the hollow gripping spindle 41.

Figure 11:
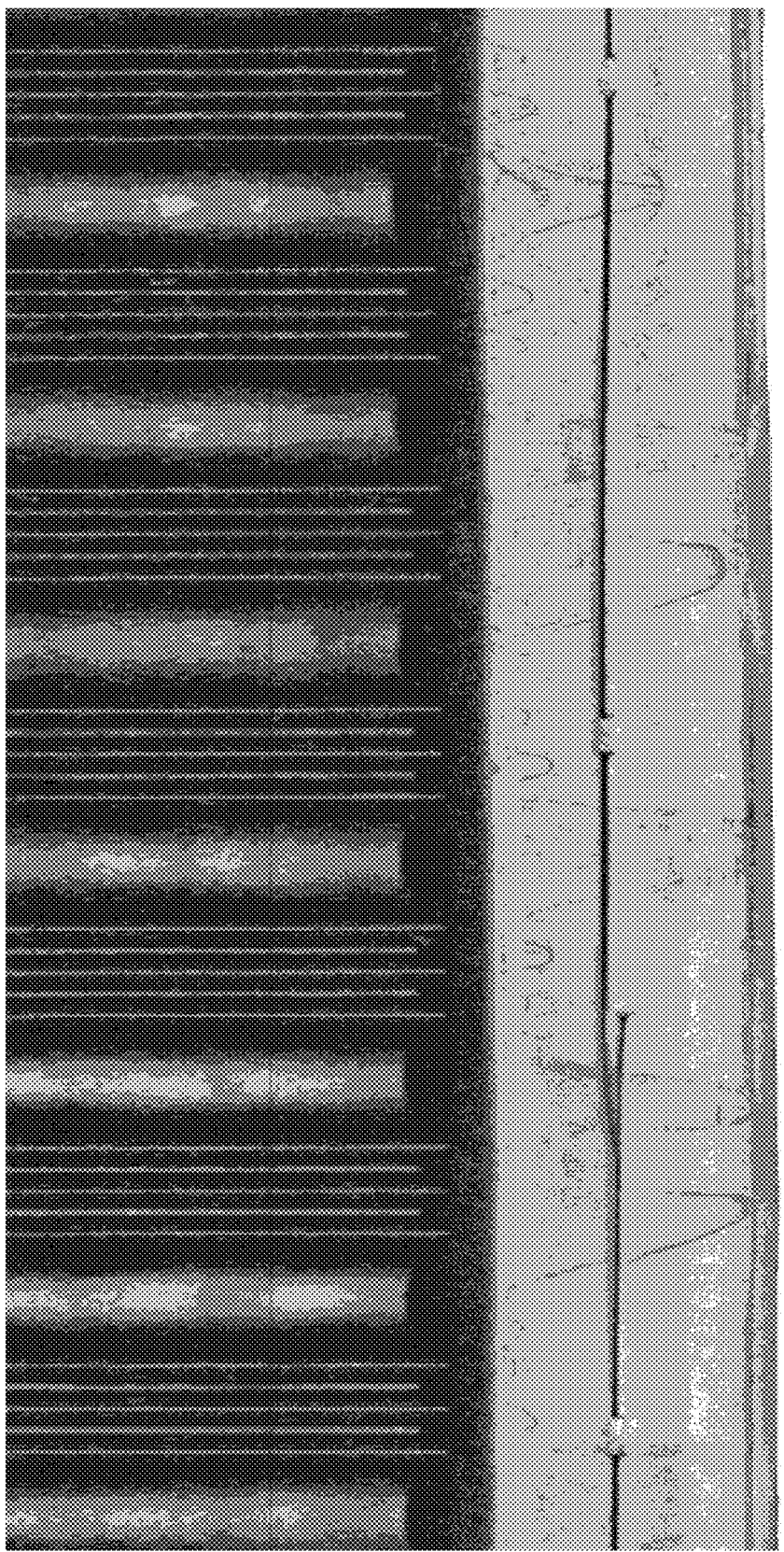
FIG. 11 shows an image of a tamper evident band of a capsule, acquired through the vision system of FIGS. 8-10.

FIG. 11 shows an exemplary image detected by the vision system 76.

For example, the vision system 76 may comprise a video camera, especially a linear one.

Thus, owing to the vision system 76, it is possible to assess the quality of the cut performed by the cutting machine on the capsule 200 under consideration, by assessing at least an image of at least one portion of the tamper evident band 203, falling within a frame of the vision system 76.

In this second embodiment, the lifting and abutting device 50 comprises, on the abutting surface 51, an engaging groove 77 arranged to engage the outer side surface 208 of the side wall 202 so as to lock the capsule 200 to be tested, on the abutting surface 51.

For example, the engaging groove 77 may be provided with an engaging area 78 shaped so as to engage the knurled area 209 of the capsule 200.

In this embodiment, the drive device 54 allows not only the translation of the lifting and abutting device 50, but also a rotation thereof around a rotation axis L substantially perpendicular to the face 44.

According to a variant, not shown in the Figures, the capsule 200 to be tested is locked on the abutting surface 51 of the lifting and abutting device 50 through a vacuum system of the known type.

Owing to the rotation of the lifting and abutting device 50, it is possible to assess images of several portions of the tamper evident band 203, including those not falling directly in the visual field of the vision system 76. In this manner, it is possible to inspect the entire length of the tamper evident band 203. Moreover, the capsule 200 may be oriented angularly depending on the position of the at least one tether element 201*b* before the capsule 200 is subjected to a tensile force.

Owing to the vision system 76, it is also possible to determine the size of the bridge elements 201*a*, their angular distribution, the regularity of the cut and the position of the cut.

The operation of the aforementioned measuring apparatus 1 embodies a measuring method comprising the steps of:
 supplying a capsule 200 to the detection unit 40;
 connecting the capsule 200 to the hollow gripping spindle 41 by having the retaining elements 213 engage said ridge 42;
 subjecting the capsule 200 to a tensile force through the pusher device 45 and detecting, through the sensor arrangement 49, an electrical signal proportional to a deformation to which said connecting elements 201 are subjected;
 moving the lifting and abutting device 50 along the operating direction O, and moving the pusher device 45 along the breakage direction D at the same time, and especially at the same speed, so that the abutting surface 51 is maintained at a set distance X; Y from the outer surface 218 of the end wall 204, the abutting surface 51 cooperating with the outer surface 218 of the end wall 204, in order to counteract an excessive tipping of the capsule 200 during the application of the tensile force.

The step of supplying a capsule 200 comprises arranging a capsule 200 with the open end 206 facing upwards, above the abutting surface 51, when the lifting and abutting device 50 is in the lowered position N, and subsequently moving the lifting and abutting device 50 along the supply direction S up to the supplying position P in which the capsule 200 turns out to be connected to the hollow gripping spindle 41 since the retaining elements 213 engage the ridge 42 (FIG. 6).

The step of arranging a capsule 200 above the abutting surface 51 may further comprise, in particular sequentially, providing a rotating disc 56 in the receiving position C, inserting a capsule 200 in the seat 57 of the rotating disc 56, and rotating the rotating disc 56 around the rotation axis M, especially substantially by 180°, until the removing position is reached, in which the capsule 200 has its longitudinal axis A substantially coinciding with the longitudinal axis G of the longitudinal cavity 46 of the hollow gripping spindle 41 and substantially coinciding with an axis of the seat 57.

The step of arranging a capsule 200 above the abutting surface 51 may further comprise removing a capsule 200 from a portion of the capsule processing line, through the capsule supplying guide 61, to supply the capsule 200 to the seat 57.

The measuring method further comprises moving the lifting and abutting device 50 along the operating direction O during a portion, until the abutting surface 51 and the outer surface 218 of the end wall 204 are spaced apart by a set distance X (FIGS. 7 and 12).

The measuring method further comprises a step of measuring the pull-off force of the connecting elements 201, comprising the step of moving the pusher device 45 along a breakage direction D to apply a tensile force to an inner side of the capsule 200 to break the bridge elements 201*a*, together with moving the lifting and abutting device 50 along the operating direction O for a first portion, during which said set distance X is maintained.

The step of measuring the pull-off force of the connecting elements 201 further comprises constantly detecting, through the sensor arrangement 49, values of the tensile force applied to the capsule 200, and thus to the connecting elements 201, simultaneously with said moving the pusher device 45 along the breakage direction D, in particular from the time when the pusher device 45 starts applying a force to the inner surface of the capsule 200.

The step of detecting said tensile force values comprises calculating a value of the pull-off force of the bridge elements 201*a*, said value of the pull-off of the bridge elements 201*a* coinciding with a first maximum force value detected, detected in particular during the first portion.

The set distance X is maintained until all bridge elements 201*a* have been fractured, namely until the sensor arrangement 49 detects the pull-off force of the bridge elements 201*a*.

The measuring method further comprises moving the lifting and abutting device 50 along the operating direction O during a further portion, until the abutting surface 51 and the outer surface 218 of the end wall 204 are spaced apart by a further set distance Y, which may be equal to, or different from, the set distance X.

Figure 13:
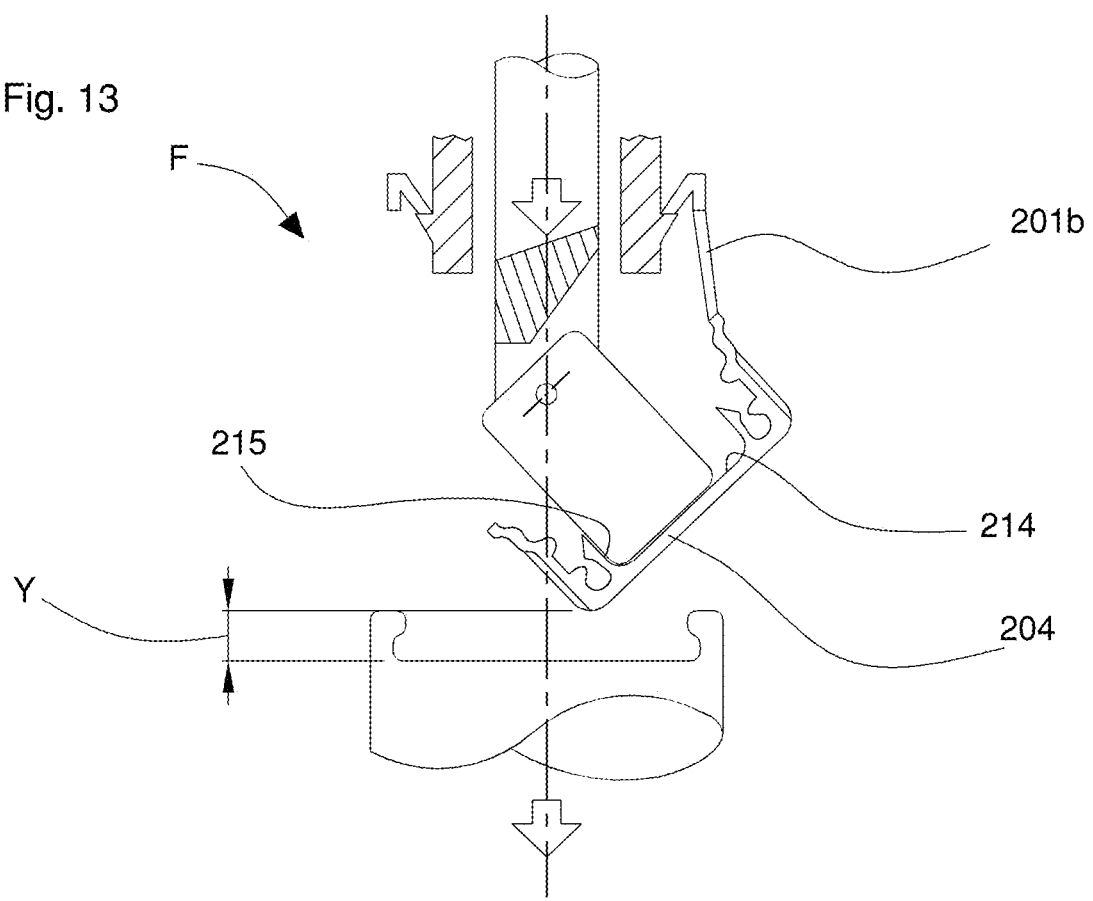

The step of measuring the pull-off force of the connecting elements 201 further comprises the step of further moving the pusher device 45 along the breakage direction D to apply a tensile force to an inner surface of the capsule 200 in order to break the tether elements 201*b*, together with moving the lifting and abutting device 50 along the operating direction O for a second portion, during which said further set distance Y is maintained (FIGS. 8 and 13).

The step of measuring the pull-off force of the connecting elements 201 further comprises constantly detecting, through the sensor arrangement 49, values of the tensile force applied to the capsule 200, and thus to the connecting elements 201, simultaneously with said moving the pusher device 45 along the breakage direction D.

The step of detecting the tensile force values comprises calculating a value of the pull-off force of the tether elements 201*b*, the value of the pull-off force of the tether elements 201*b* coinciding with a second maximum force value detected subsequently to the first maximum force value, detected in particular during the second portion.

The further set distance Y is maintained until all tether elements 201*b* have been fractured, namely until the sensor arrangement 49 detects the pull-off force of the tether elements 201*b*.

Maintaining the set distance X during the first portion, and the further set distance Y during the second portion, allows to counteract a tipping of the capsule 200 during said application of said tensile force, since if the capsule 200 tilts slightly, the abutting surface 51 may cooperate with at least one area of the outer surface 218 of the end wall 204, thereby preventing an excessive tilting which hampers the measurement of the pull-off force of the connecting elements 201.

With reference to the first exemplary embodiment of the measuring apparatus 1, the step of moving the pusher device 45 along the breakage direction D may comprise a first step in which it is provided that the first pusher 70 is moved along the breakage direction D, whereas the second pusher 71 is kept in place, to apply a tensile force to a portion of the bottom surface 214 of the end wall 204 of the capsule 200 in order to break the bridge elements 201a, such portion being substantially coaxial with the longitudinal axis A of the capsule 200 (FIG. 7).

The step of moving the pusher device 45 along the breakage direction D may further comprise a second step, subsequent to the first step, in which it is provided that the second pusher 71 is moved along the breakage direction D, whereas the first pusher 70 is kept in place, to apply a tensile force, in order to break the tether elements 201b, to a portion of the bottom surface 214 of the end wall 204 of the capsule 200 and to a portion of an inner seal surface 215 of the seal element 207 (when the capsule 200 is provided with the seal element 207) or to a portion of the bottom surface 214 of the end wall 204 of the capsule 200, and to a portion of the inner side surface 216 (when the capsule 200 is not provided with the seal element 207) (FIG. 8).

With reference to the second exemplary embodiment of the measuring apparatus 1, prior to the connection of the capsule 200 to the hollow gripping spindle 41, the measuring method may further comprise the step of mutually approaching the lifting and abutting device 50 and the pusher device 45, such that the abutting surface 51 and the thrust surface 52 abut on the end wall 204 from opposite parts, so as to engage the capsule 200 in the engaging groove 77, such that the capsule 200 is locked angularly, that is, it cannot rotate freely (FIG. 9).

After the step of mutually approaching the lifting and abutting device 50 and the pusher device 45, the measuring method may further comprise a phasing step of the capsule 200, which comprises rotating the lifting and abutting device 50 around its rotation axis L, so as to orient the capsule 200 on the basis of the position of a reference element thereof, such as the position of a tether element 201b, the position of said reference element being detected by acquiring at least one image of the tamper evident band 203 through the vision system 76. Owing to the phasing step, a reference element of the capsule 200 may be oriented according to a desired orientation.

After the step of mutually approaching the lifting and abutting device 50 and the pusher device 45, the measuring method may further comprise an inspection step of the capsule 200, which comprises rotating the lifting and abutting device 50 around its rotation axis L, and acquiring at least one image of an area of the tamper evident band 203. The rotation of the lifting and abutting device 50 and the acquisition of at least one image may be repeated until images of the entire outer surface of the tamper evident band 203 are obtained.

After carrying out the phasing step of the capsule 200 and/or the inspection step of the capsule 200, the measuring method comprises the step of connecting the capsule 200 to the hollow gripping spindle 41, and, subsequently, the step of measuring the pull-off force of the connecting elements 201, during which the vision system 76 may be turned off (FIG. 10).

The values of the force applied to the capsule 200 to be tested, and, as a result, to the connecting elements 201, are acquired in the processing and control unit of the measuring apparatus 1, and possibly stored therein.

When the sensor arrangement 49 detects a measurement signal proportional to the force values, the processing and control unit processes the measurement signals thus acquired to convert them into force values.

At the end of the step of measuring the pull-off force of the connecting elements 201, the measuring method may comprise cutting the tamper evident band 203 remained anchored to the ridge 42, by means of the cutting device 64, and ejecting the capsule 200 by using an air blow.

The measuring method may further comprise plotting a trend curve of the force values as a function of the movement of the pusher device 45 along the breakage direction D, or as a function of time, and displaying it on the displaying device 13.

FIGS. 16 and 17 are two exemplary graphs showing trend curves of the tear-off values detected by testing a first exemplary capsule and a second exemplary capsule, respectively, shown in FIG. 16a and in FIG. 17a, respectively.

Each graph shows the trend of the tear-off values detected by the measuring apparatus 1 (curve represented by dashed line) by applying the measuring method described above, the trend of the tear-off values detected in a first detection mode (curve represented by dotted line), and the trend of the tear-off values detected in a second detection mode (curve represented by a solid line).

With particular reference to FIG. 18, the first detection mode provides that to the at least one tether element 201b is applied a tensile force directed along a direction substantially parallel to the longitudinal axis A of the capsule 200 (or vertical, or axial or at 0°), that is substantially parallel to the longitudinal axis of a bottle on which is mounted the capsule 200 to be tested. By contrast, the second detection mode provides that to the at least one tether element 201b is applied a tensile force directed along a direction substantially perpendicular to the longitudinal axis A of the capsule 200 (or horizontal, or radial, or at 90°), that is substantially perpendicular to the longitudinal axis of a bottle on which is mounted the capsule 200 to be tested.

The first and second detection modes may be implemented by the measuring apparatus 1 (FIGS. 14 and 15, respectively) or by another laboratory machine.

Each curve represented in the graph has a first maximum point which coincides with the pull-off force of the bridge elements 201a, and which is detected during the first travel portion of the pusher device 45 along the breakage direction D, and a second maximum point which coincides with the pull-off force of the tether elements 201b, and which is detected during the second travel portion of the pusher device 45 along the breakage direction D.

The first and second portions may substantially be 15 mm in length.

The measuring method may further comprise analyzing the detected force values to obtain production information on the capsule 200, this information being used to make a change to one or more parts of a capsule production plant in which the tested capsule 200 has been fabricated, especially when the measuring apparatus 1 is used in line.

Specifically, from the analysis carried out on the force values detected, it is possible to determine whether one or more parts of the capsule production plant are experiencing a failure. For example, it is possible to detect whether the cutting machine has a cutting blade that is worn or malfunctioning, since the cutting parameters used are not suitable. As a result, therefore, the cutting action may be corrected by replacing the worn blade or by making changes to the cutting parameters of the cutting machine.

Still, by analyzing the graphs illustrating the force as a function of time, it is possible to determine the elongation of the bridge elements 201a, and thus compare the elongation of the bridge elements 201a in capsules 200 made of different materials, or determine whether the material used for the molding of a tested capsule 200 is not compliant, because the elongation detected deviates from an elongation expected for that material.

In other words, the detected force values may be related to a failure condition of one part of the capsule production plant.

Owing to the movable lifting and abutting device 50, during the measuring step the abutting surface 51 cooperates with the outer surface 218 of the end wall 204 to counteract a possible rotation of the capsule 200 with respect to its longitudinal axis A.

This allows to obtain a reliable measurement of the pull-off force of the connecting elements 201, since it is certain that all connecting elements 201 are fractured.

Moreover, still owing to the movable lifting and abutting device 50 as well as to the vision system 76, a capsule 200 may be conveniently oriented, and supplied to the detection unit 40.

Owing to the shape of the pusher device 45 it is possible to detect the pull-off force of capsules 200 provided with bridge elements 201a and/or with at least one tether element 201b.

The measuring apparatus 1 further comprises measuring the pull-off force of the connecting elements 201 of capsules 200 having a diameter in a range of 25 to 38 mm, and a height in a range of 10 to 20 mm, without making any changes to the components of the measuring apparatus 1.

If it is desired to test a capsule 200 having a different size from the one reported above, it will be necessary to change only the hollow gripping spindle 41, in addition to the parts which move the capsules 200 to the working position. In other words, the measuring apparatus 1 turns out to be very versatile.

Finally, the measuring apparatus allows to test the pull-off force of connecting bridge elements 201a of different types of bands, in capsules 200 of similar size.

FIGS. 19-24 show another four examples of measuring apparatuses.

Figure 19:
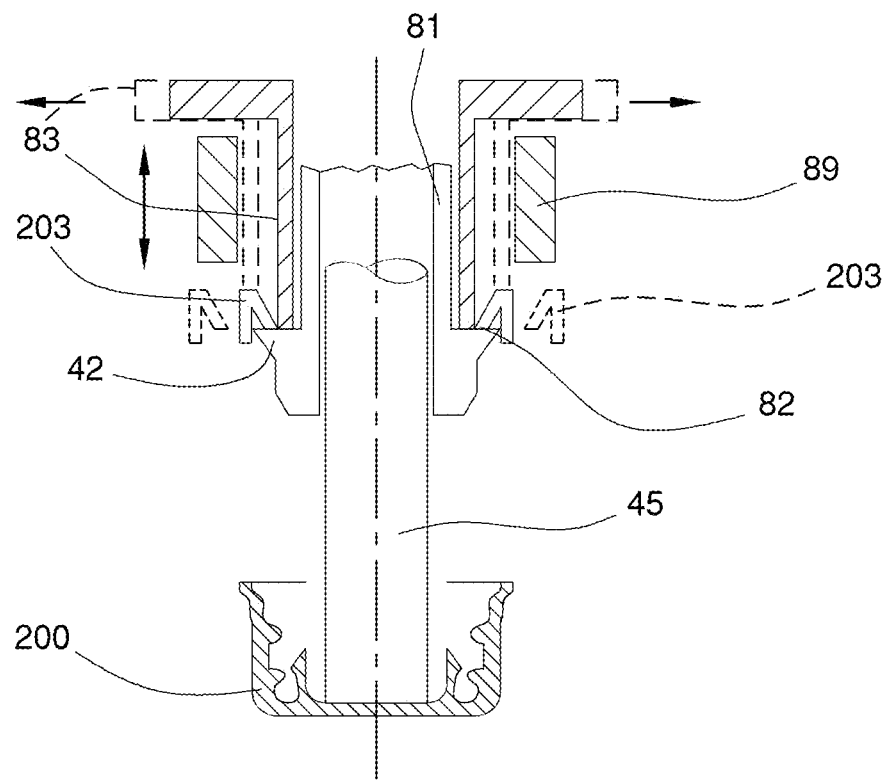
FIG. 19 shows a vertical elevation of a schematic of another exemplary measuring apparatus implemented according to the present invention.

The measuring apparatus in FIG. 19 comprises a tubular element 81 (for example, cylindrical in shape) having a vertical axis. Specifically, the measuring apparatus may comprise the axial thrust element 45, which is axially movable inside the tubular element 81. As in the previous examples, the axial thrust element 45 is configured to push a capsule 200 downwards, in order to cause a breakage of the frangible arrangement 201 connecting the capsule 200 to the tamper evident band 203 (having a closed annular shape).

The axial thrust element 45 shown in the examples in FIGS. 19-22, may be in particular similar to that in the previous examples.

Specifically, the measuring apparatus may comprise the annular ridge 42, which radially projects from the tubular element 81. The annular ridge 42 may comprise, in particular, at least one reaction surface 82 configured to act as an abutting surface axially retaining the tamper evident band 203 when the axial thrust element 45 pushes the capsule 200 downwards to cause the breakage, as seen in the previous examples. Specifically, such reaction surface 82 may be extended in a circumferential direction (in either a continuous or non-continuous mode).

The annular ridge 42 shown in the examples in FIGS. 19-22, may be similar, in particular, to that in the previous examples.

The reaction surface 82 may comprise, in particular, an external diameter larger than an internal diameter of the tamper evident band 203, so as to axially retain the tamper evident band and allow the breakage of the frangible arrangement 201.

The measuring apparatus may comprise, in particular, a sensor arrangement 49 (not shown in FIGS. 19-22, but provided in these exemplary embodiments) configured to detect at least one force applied by the axial thrust element 45 to the capsule 200. Each of the measuring apparatuses in FIGS. 19-22, therefore, comprises a sensor arrangement for measuring the pull-off force of the frangible arrangement, which sensor arrangement may be, in particular, similar to the ones described in the previous examples.

The measuring apparatus shown in FIG. 19 (as well as those illustrated in FIGS. 20-22) may comprise, in particular, the various elements (as a whole or in part) of the measuring apparatuses previously described, not shown for the sake of simplicity. Specifically, it is possible that the exemplary measuring apparatuses shown in FIGS. 19-22 are not provided with the cutting device 64, since as will be better explained hereinafter in the description, in these examples, the removal, or discharge, of the tamper evident band following the breakage of the frangible arrangement, and the resulting separation of the capsule, is carried out by disengaging the tamper evident band from, or moving the tamper evident band out of, the annular ridge 42 without cutting or tearing, or otherwise opening the tamper evident band, but leaving intact the closed annular shape of the band itself.

The measuring apparatus may comprise, in particular, a band disengagement arrangement configured to cause at least one relative movement between the annular ridge 42 and the tamper evident band 203 following the breakage of the frangible arrangement 201.

The aforesaid relative movement may comprise, in particular, either a radial widening of the tamper evident band 203 (as in the examples in FIGS. 19 and 20), or a radial collapse of the annular ridge 42 (as in the example in FIGS. 21 and 22), or both (namely both a radial widening of the tamper evident band 203, and a radial collapse of the annular ridge 42).

As a result of the aforesaid relative movement, the tamper evident band 203 shall remain intact, i.e., with a closed annular shape, and may have an internal diameter larger than an external diameter of the annular ridge 42, at least for the time necessary to have the tamper evident band 203 disengaged from, or moved out of, the annular ridge 42, and to have the possibility of removing the tamper evident band 203, still with its closed annular shape.

The band disengagement arrangement may comprise (as in the examples in FIGS. 19 and 20) a radial thrust portion configured to radially widen the tamper evident band 203 outwards (a part of the tamper evident band 203 that has been widened by the band disengagement arrangement is shown in FIG. 19, indicated by dashed line).

Specifically, the radial thrust portion may be moved so as to assume at least a first contracted configuration, in which the radial thrust portion is arranged radially inside the reaction surface 82 (namely inside the tamper evident band held by the annular ridge and not yet radially widened), and at least a second expanded configuration, in which the radial thrust portion is moved radially outwards with respect to the first configuration, to radially push and radially widen the tamper evident band 203 so as to move the band beyond the annular ridge 42, without breaking the band, this remaining intact in its closed annular shape. FIG. 19 shows, by dashed line, a part of the radial thrust portion in the second band-widening configuration.

The radial thrust portion may comprise, as in the example nu FIG. 19, two, three or even more than three sectors 83, arranged along a circumference, each of which can be moved in a radial direction. Specifically, each sector 83 may comprise a sector extended along a circumferential arc. In the first contracted configuration, with smaller-diameter, the various sectors 83, taken as a whole, may form a substantially continuous cylindrical shape.

The measuring apparatus may comprise, in particular, an actuator device (not shown) configured to drive a movement of the radial thrust portion between the first configuration and the second configuration. These actuator device may comprise, in particular, at least one actuator. Notably, it is possible to arrange an actuator device of pneumatic type. In particular, it is possible to arrange one or more linear actuators. It is possible to arrange an actuator that actuates all sectors 83 (e.g., through a movement transmission mechanism). It is possible that each sector 83 may be operatively connected to, and actuated by, a respective actuator.

Figure 20:
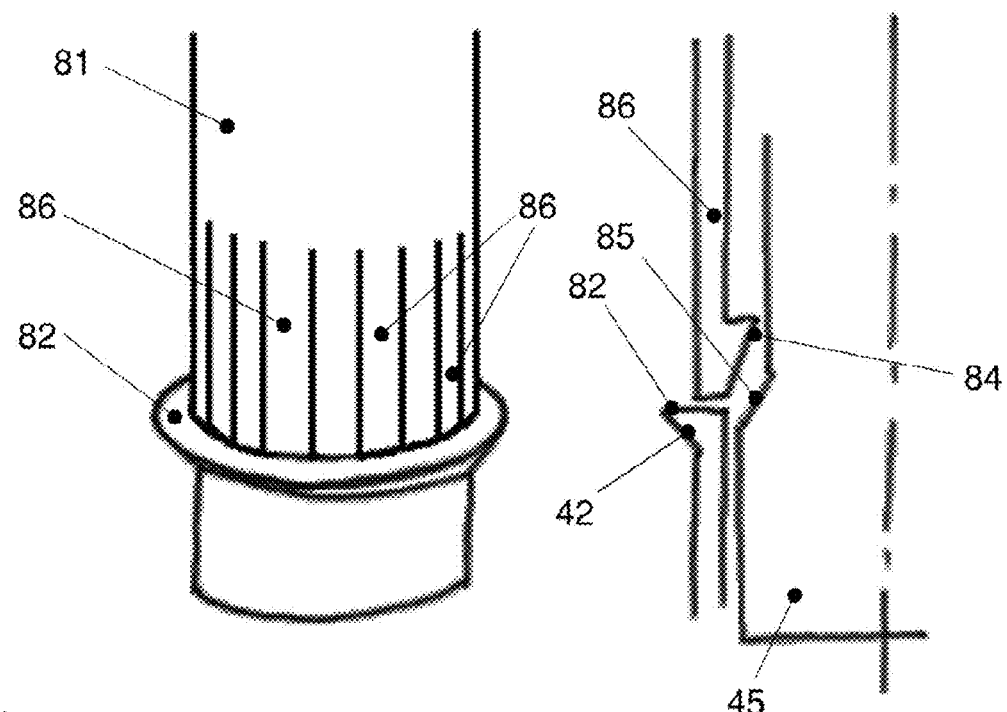
FIG. 20 schematically shows a perspective view (on the left) and a vertical elevation (on the right) of another exemplary measuring apparatus implemented according to the present invention.

The radial thrust portion may comprise, as in the example of FIG. 20, an internal profile 84 configured for contact with an external counter profile 85 supported by said axial thrust element 45, such that an upward motion of the axial thrust element 45 causes a radial thrust outwardly of the radial thrust portion as a result of the contact between the internal profile 84 and the external counter profile 85.

The aforesaid internal profile 84 may be, in particular, arranged on one end of one, two or more than two elastic elements 86 configured to elastically return to the rest position towards the first configuration (with a reduced diameter).

In particular, the internal profile 84 may be arranged on a lower end of a circumferential arrangement of elastic elements 86, arranged around the vertical axis. Each elastic element 86 may comprise, in particular, an elastic tab elongated in an axial direction. The internal profile 84 may be obtained, as in the example in FIG. 20, from a plurality of profile portions each of which is arranged on a respective elastic element 86. The external counter profile 85 may be made, as in the example in FIG. 20, from a flared (e.g., truncated cone-shaped) portion of the axial thrust element 45 such that this thrust element has a diameter variation from a larger diameter, in an element part arranged in a lower position, to a smaller diameter, in an element part arranged in an upper position.

Specifically, each elastic element 86 may comprise a wall portion of the same tubular element 81, as in the example in FIG. 20. Each elastic element 86 may turn out to be defined, on two opposite sides, by two pass-through openings, or notches, obtained on the portion wall of the tubular element 81, such that the circumferential arrangement will be formed by a series of vertical elastic elements 86 spaced out by wall portions that have no internal profile 84 and are not intended for expansion, with a series of vertical pass-through openings defining the separation interface between the expandable vertical elastic elements 86 and the fixed wall portions. Each pass-through opening or notch may comprise, in particular, a very thin slot, such that the aforesaid circumferential arrangement of expandable elastic elements 86 spaced out with fixed wall portions may give rise to an outer surface (here, cylindrically-shaped) of the tubular element 81, which can be considered virtually continuous and substantially free of any relevant interruptions.

After the breakage of the frangible arrangement 201, the thrust element 45 (starting from a lower position, similar to the one illustrated in FIG. 19) moves upwards. In the example in FIG. 20, the upward movement, that continues until a configuration (upper position, not shown) in which the counter profile 85 interacts through contact with the profile 84, causes a radial expansion of the elastic elements 86 outwards, and, as a result, the ejection, through disengagement, of the tamper evident band 203 out of the annular ridge 42 (without any breakages in the band, this remaining intact in its closed annular shape). In this upper configuration, the part of the thrust element 45 having the larger diameter keeps the elastic elements 86 in a widened position, whereby the band is removed outwards.

After the disengagement or the removal of the band, the thrust element 45 moves once again downwards until it reaches an intermediate position (FIG. 20, on the right, where the term "intermediate" is to be understood with reference to the lower position, which is reached to break the frangible arrangement, and to the upper position, which is reached to disengage the tamper evident band), for a new measuring cycle for the pull-off force of the frangible arrangement of another capsule.

Figure 21:
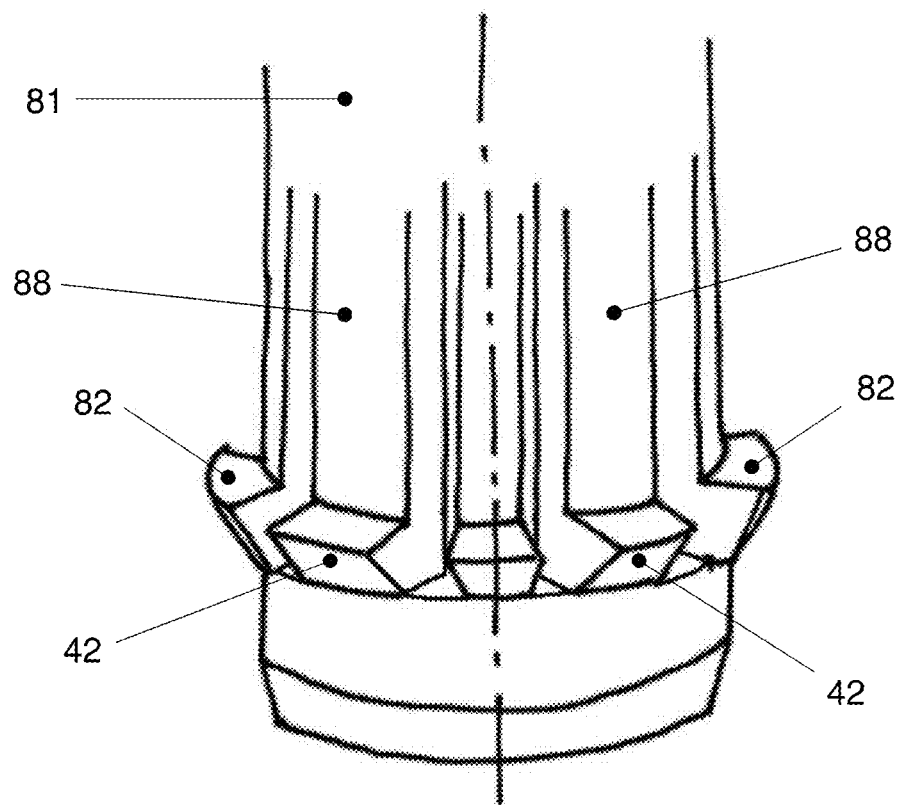
FIG. 21 schematically shows a perspective view of another exemplary measuring apparatus implemented according to the present invention.
Figure 22:
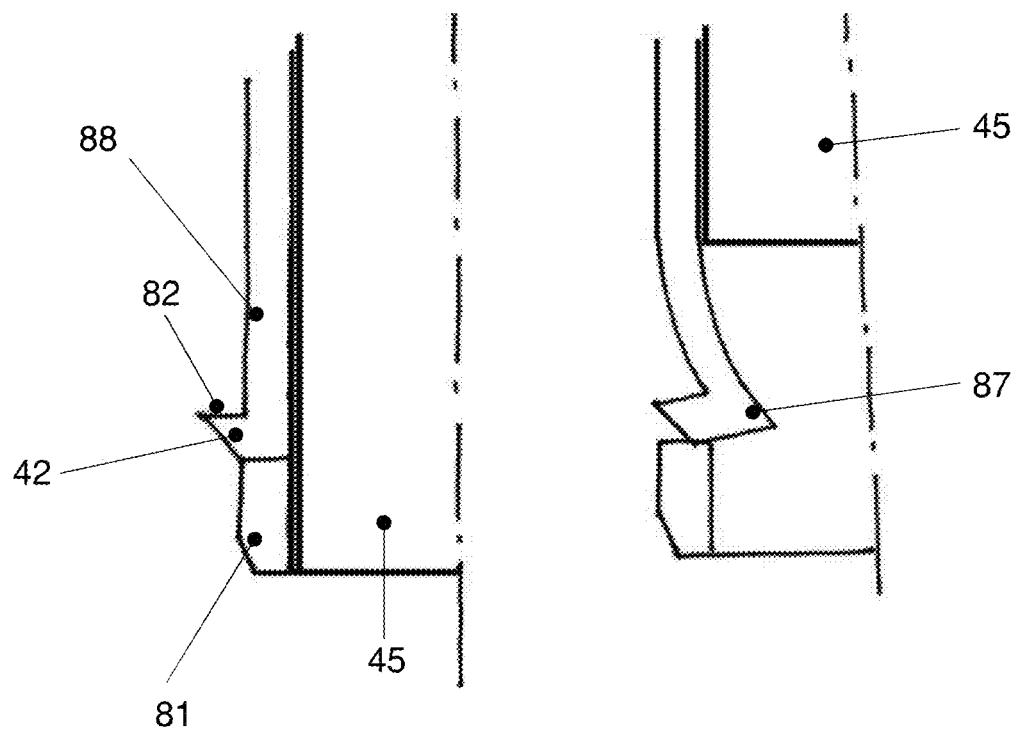
FIG. 22 shows a vertical elevation of a detail of the apparatus in FIG. 21, in a tamper evident band connection configuration (on the left) and in a tamper evident band release configuration (on the right)

The band disengagement arrangement may comprise a collapsible portion 87 of the tubular element 81, as in the example in FIGS. 21 and 22. The annular ridge 42 may be, in particular, arranged on the collapsible portion 87. Such collapsible portion 87 may be constructed, in particular, similarly to the elastic elements 86 in FIG. 20, with the difference that here the annular ridge 42 is arranged on the collapsible portion 87, whereas in the example in FIG. 20, the annular ridge 42 is a fixed element, and the movable element, which can be expanded by increasing its own diameter to act as an outward radial pusher, is represented by an elastic wall portion of the tubular element 81.

Furthermore, such collapsible portion 87 may be capable of assuming an expanded band-retention configuration (illustrated in FIG. 22, on the left), in which the reaction surface 82 of the annular ridge 42 is capable of axially retaining the tamper evident band 203, and a collapsed release configuration (illustrated in FIG. 22, on the right), in which the reaction surface 82 of the annular ridge 42 curves radially inwards, thus decreasing its own diameter with respect to the expanded larger-diameter retention configuration. In the collapsed release configuration, the annular ridge 42 may release the tamper evident band 203.

The collapsible portion 87 may be configured, in particular, to assume the collapsed release configuration after the breakage of the frangible arrangement 201 caused by the axial thrust element 45. After the breakage of the frangible arrangement 201, the thrust element 45 moves upwards. The upward movement, that continues until a configuration in which it no longer internally counteracts the collapsible portion 87, namely a configuration similar to the one shown in FIG. 22 on the right, causes the collapse of the collapsible portion 87, whereby the latter elastically moves to the contracted smaller-diameter rest position, due to the absence of any internal counteraction.

The collapsible portion 87 may comprise one, two or more than two longitudinal elastic elements 88 extending vertically in length, as in the example in FIGS. 21 and 22. Each elastic element 88 may be configured to move to the rest position in the collapsed release configuration.

The measuring apparatus may comprise, in particular, an abutment arrangement arranged to maintain the elastic elements 88 in the aforesaid expanded configuration for retaining the tamper evident band, whereas the axial thrust element 45 pushes the capsule 200 downwards to break the frangible arrangement 201.

As in this example, the abutment arrangement may comprise the same axial thrust element 45, which will be configured to (sequentially) assume an intermediate position (to allow the insertion of the tamper evident band in the annular ridge), a lower position (to obtain the thrust on the capsule and the breakage of the frangible arrangement) and an upper position (to obtain the collapse of the annular ridge and allow the disengagement of the tamper evident band).

In the intermediate position (shown, for example, in FIG. 22, on the left, or in FIG. 20, on the right), the axial thrust element 45 can counteract the elastic elements 88 so as to maintain them in the expanded retention configuration.

In the intermediate position, the axial thrust element 45 allows to lift the capsule 200 (as described in the previous examples, in particular by means of a lifting device which lifts the capsule) to engage the tamper evident band 203 in the annular ridge 42. The aforesaid lifting device may be found in all examples in FIGS. 19-22.

In the lower position (shown, for example, in FIG. 19), the axial thrust element 45 may still be capable of counteracting the elastic elements 88 so as to maintain them in the expanded retention configuration, after the axial thrust element 45 itself has pushed the capsule 200 downwards.

In the upper position (shown, for example, in FIG. 22, on the right), the axial thrust element 45 is positioned such that the elastic elements 88 can freely collapse (by elastically moving to a smaller-diameter rest position) towards the collapsed band release configuration.

FIGS. 23 and 24 show another exemplary measuring apparatus, in which the radial thrust portion comprises a thrust profile 90 attached to the axial thrust element 45. The thrust profile 90 may, in particular, radially protrude from the axial thrust element 45. The thrust profile 90 may be, in particular, arranged on a plurality of elements or attachments, in particular having a flat, laminar or plate-like shape, firmly supported by the axial thrust element 45 and radially protruding from an outer surface of the thrust element itself.

The thrust profile 90 may be, in particular, configured so as to radially widen the tamper evident band 203 outwards as a result of a downward movement of the axial thrust element 45 (see, for example, the movement that may be seen from the left part to the right part in FIG. 23).

The thrust profile 90 may be, in particular, inserted into one or more vertical slots 91 obtained in the tubular element 81 so as to allow the vertical movement in both directions of the axial thrust element 45. The thrust profile 90 may comprise, in particular, at least one thrust surface having a circumferential arrangement. The thrust surface may have, in particular, an inverted flared shape, that is inclined so as to be wider towards the top.

As in the shown example, the thrust profile 90 may comprise a plurality of distinct profile portions arranged circumferentially, each of them being inserted in a respective slot 91 obtained in the tubular element 81.

When the axial thrust element 45 moves downwards to perform the pull-off test for the frangible arrangement of the tamper evident band 203, the thrust profile 90 supported by the axial thrust element 45 also moves downwards, and delivers, owing to its shape, a radial thrust action towards the tamper evident band 203, after the breakage of the frangible arrangement, so as to widen the band itself and allow it to be removed and ejected out the annular ridge 42.

As regards the examples in FIGS. 19-24, the apparatus may comprise a lifting element, such as the lifting element 53, configured to transport the capsule 200 at least from a lower position, in which the capsule is far from the annular ridge 42, to an upper position, in which the tamper evident band 203 of the capsule has passed the annular ridge 42 and can be retained axially by the latter.

As regards the examples in FIGS. 19-24, the apparatus may comprise an axial thrust portion 89 (see FIG. 19 or 23) configured to axially push the tamper evident band 203 downwards, after the band disengagement arrangement caused the aforesaid relative movement between the annular ridge 42 and the tamper evident band 203, that is after the external removal of the tamper evident band out of the annular ridge 42. This axial thrust portion 89 may comprise, in particular, an annular-shaped pusher, axially movable in the vertical direction, in particular controlled by an actuator device. In any case, in order to promote the moving away of the tamper evident band, which is kept in its closed annular shape, one may provide a different type of pusher device, e.g., a blowing device to jet air or another gas.

Referring to all embodiments described above, the measuring apparatus comprises an electronic control and management device (for example, at least a CPU or an electronic processor) with a data processing system. Each measuring apparatus described herein can be networked to allow data exchange with the outside world. Each measuring apparatus may be, in particular, connected to at least one operating system provided with at least one supervisory program, in particular to control the execution of programs and/or regulate the flow of operations.

The supervisory program may be, in particular, configured to provide the electronic control and management device of the measuring apparatus with one or more operating parameters of the various actuators (or work "recipes"), and to store one or more data detected by the various sensors. The supervisory program may be, for example, applied to a single production line including the measuring apparatus, in particular where the latter actually turns out to form part of the production line. In other examples, the supervisory program may be applied to a plant as a whole, which includes two or more production lines. In such case, the measuring apparatus may be used as a stand-alone apparatus, for example in a laboratory not included in one of the production lines, to test the production of the several lines.

A 'basic production line', for example, may be understood to include a cutting machine matched in line with a measuring apparatus.

In any case, it may be provided that the cutting machine is a stand-alone machine, and that the measuring apparatus is configured to measure the pull-off force on a batch of capsules previously fabricated and possibly stored. For example, the measuring apparatus may be used as a standalone apparatus to test several capsules obtained from different production lines, even having different shapes.

The measuring apparatus may comprise, in particular, a user interface connected to electronic control and management device, which can be configured such that on the user interface one may find a SPC (Statistical Process Control) report, adapted, for example, to retrieve one or more of the following data: name of the product or of the production lot, start time of the work cycle and/or end time of the work cycle, lot size (e.g., number of capsules in the lot), number of capsules processed, a predefined minimum threshold force value, etc.

The SPC report on the user interface may comprise, in particular, the detected tear-off force (e.g., an average tear-off force value for the processed capsules). In particular, the SPC report on the user interface may comprise a minimum threshold value of the tear-off force and/or a maximum threshold value of the tear-off force. In particular, the SPC report on the user interface may comprise the number of processed capsules having a tear-off force lower than a minimum threshold value and/or the number of processed capsules having a tear-off force higher than a maximum threshold value. The SPC report on the user interface may comprise, in particular, an indicator (e.g., an ideogram) of the test general result.

The electronic control and management device may be configured, in particular, to compare each tear-off force value detected with a predetermined minimum threshold value and/or with a predetermined maximum threshold value. The general result of the test may be obtained by processing the detected data according to a predetermined algorithm, for example based on the number of capsules exceeding the minimum threshold and/or the maximum threshold. In particular, the electronic control and management device may be configured so as to provide the supervisory program with information on the correct management of the production line.

The invention claimed is:

1. Measuring apparatus arranged for measuring the pull-off force of connecting elements of a capsule, said measuring apparatus including:
   a detecting unit arranged for obtaining the pull-off force of said connecting elements by measuring a plurality of tensile force values to which said capsule is subjected in said measuring apparatus, said detecting unit including:
      a hollow gripping spindle provided with a ridge to which said capsule is connectable, said ridge being configured for interacting with said capsule to retain axially a tamper evident band of said capsule;
      a pusher device arranged for interacting with at least one portion of an inner surface of said capsule moving along a breakage direction to impose said tensile force on said capsule in order to cause a breakage of at least one part of said connecting elements of said capsule, said pusher device being shaped to slide inside a longitudinal cavity obtained inside said hollow gripping spindle;
      a sensor arrangement associated with said pusher device to detect said plurality of values of said tensile force imposed by said pusher device on said portion of said inner surface during movement along said breakage direction;
   wherein said measuring apparatus further includes a lifting and abutting device arranged for supplying said capsule to said detecting unit, said lifting and abutting device being movable along an operating direction, having at least one component that is substantially parallel to and concordant with said breakage direction, and said pusher device being movable along said breakage direction, simultaneously so that an abutting surface with which said lifting and abutting device is provided is maintained at a set distance from an end wall of said capsule, said abutting surface cooperating with said end wall, in order to counteract excessive tipping of said capsule during the application of said tensile force.

2. Measuring apparatus according to claim 1, wherein said abutting surface is configured for restingly receiving said end wall, said lifting and abutting device being movable along a supply direction to push said end wall so as to supply said capsule to said detecting unit, said supply direction being substantially opposed to said operating direction.

3. Measuring apparatus according to claim 2, wherein on said abutting surface of said lifting and abutting device an engaging groove is obtained that is arranged to engage at least one portion of a side wall of said capsule so as to lock said capsule on said abutting surface during movement along said supply direction.

4. Measuring apparatus according to claim 2, wherein said lifting and abutting device further includes a lifting element of cylindrical shape that is alternatively movable along said supply direction or along said operating direction by means of a drive device to which it is connected to supply alternately said capsule to said detecting unit or to abut on said end wall when the capsule tips excessively.

5. Measuring apparatus according to claim 2, wherein said lifting and abutting device is rotatable around a rotation axis by means of a drive device in order to orient a reference element of said capsule according to a desired orientation.

6. Measuring apparatus according to claim 1, wherein said pusher device includes a pusher arranged for interacting with a portion of a bottom surface of said end wall, when said pusher is moved along said breakage direction by an actuator of a movement device to which it is connected to impose on said bottom surface said tensile force in order to cause a breakage of bridge elements of said connecting elements of said capsule, said movement device being mounted to a support structure of said detecting unit.

7. Measuring apparatus according to claim 6, wherein said pusher device further includes a further pusher arranged for interacting with a portion of said bottom surface of said end wall and a portion of an inner seal surface of a seal element of said capsule or with a portion of said bottom surface and a portion of an inner side surface of said side wall when said further pusher is moved along said breakage direction to impose said tensile force in order to cause breakage of at least one tether connecting element of said connecting elements of said capsule, said further pusher being slidable inside a longitudinal opening obtained inside said pusher by a further actuator of said movement device.

8. Measuring apparatus according to claim 6, wherein said sensor arrangement includes a first load cell associated with said pusher and a second load cell associated with said further pusher to detect values of said tensile force that said pusher and said further pusher apply respectively to said surface portions.

9. Measuring apparatus according to claim 1, wherein said pusher device includes a first portion and a second portion, said second portion being hinged on said first portion so as to be rotatable around a hinge axis that is substantially perpendicular to a longitudinal axis of said longitudinal cavity of said hollow gripping spindle, said first portion and said second portion being aligned in an aligned configuration to apply said tensile force to said bottom surface to fracture at least one bridge of said connecting elements of said capsule and said second portion rotating with respect to said first portion engaging an L-shaped portion of said inner surface having a side arranged on said bottom surface and the other side arranged on said inner seal surface or on said inner side surface to fracture said at least one tether element.

10. Measuring apparatus according to claim 1, and further including a vision system arranged for acquiring at least one image of said tamper evident band before said capsule is connected to said hollow gripping spindle.

11. Measuring apparatus according to claim 1, and further including a capsule positioning device arranged for positioning said capsule above said abutting surface, when said lifting and abutting device is in a lowered position in which said abutting surface is positioned below a face of a support plate of a frame of said measuring apparatus, said face being intended for supporting said detecting unit.

12. Measuring apparatus according to claim 11, wherein said capsule positioning device includes a rotating disc mounted to said face and provided with a seat shaped to receive and house said capsule to be tested arranged with an end facing upwards, said rotating disc being rotatable around a rotation axis thereof between a receiving position in which said seat faces an inlet for said capsule and a removing position, in which said seat is substantially coaxial with said pusher device, in such a manner that a longitudinal axis of said capsule is substantially parallel, in particular coinciding, with a longitudinal axis of said longitudinal cavity of said hollow gripping spindle.

13. Measuring method for measuring the pull-off force of connecting elements of a capsule by a measuring apparatus according to claim 1, said capsule being provided with a cup body defined by a side wall and by an end wall that bounds, at one end, said side wall, said capsule further including a tamper evident band connected to said side wall by means of said connecting elements including bridge elements and/or at least one tether element, said measuring method including the steps of:
supplying a capsule to said detecting unit;
connecting said capsule to said hollow gripping spindle;
subjecting to tensile force said capsule by said pusher device and detecting by said sensor arrangement values of said tensile force;
wherein said measuring method further includes the step of:
moving said lifting and abutting device along said operating direction and moving said pusher device along said breakage direction simultaneously so that said abutting surface is maintained at a set distance from said outer surface of said end wall, said abutting surface cooperating with said outer surface of said end wall, in order to counteract excessive tipping of said capsule during the application of said tensile force.

14. Measuring method according to claim 13, wherein said supplying includes arranging a capsule with said end facing upwards above said abutting surface when said lifting and abutting device is in a lowered position, and moving said lifting and abutting device along said supply direction until said capsule is connected to said ridge of said hollow gripping spindle and in which said moving said lifting and abutting device along said operating direction and said moving said pusher device along said breakage direction includes:
moving said lifting and abutting device along said operating direction by a portion until the abutting surface and said outer surface of said end wall are spaced apart by said set distance;
moving said pusher device along said breakage direction to impose said tensile force on said inner surface of said capsule to break said bridge elements and together move said lifting and abutting device along said operating direction for a first portion during which said set distance is maintained;
the step of detecting said tensile force values including calculating a pull-off force value of said bridge elements, said pull-off force value of said bridge elements coinciding with a first maximum force value detected during said first portion;
said set distance being maintained until all said bridge elements have been fractured.

15. Measuring method according to claim 14, and including, further, the steps of:
moving said lifting and abutting device along said operating direction by a further portion until said abutting surface and said outer surface of said end wall are spaced apart by a further set distance;
further moving said pusher device along said breakage direction to impose said tensile force on said inner surface of said capsule to break said tether elements and together move said lifting and abutting device along said operating direction for a second portion during which said further set distance is maintained;
the step of detecting said tensile force values includes calculating a pull-off force value of said tether elements, the pull-off force value of said tether elements coinciding with a second greater force value detected after said first maximum force value during said second portion;
said further set distance being maintained until all said tether elements have been fractured.

16. Measuring method according to claim 15, wherein said moving said pusher device along said breakage direction includes a first step in which said first pusher is moved by maintaining said second pusher stationary to impose a tensile force on a portion of said bottom surface of said end wall to break said bridge elements and a second step, subsequent to said first step, in which said second pusher is moved along said breakage direction by maintaining said first pusher stationary to impose a tensile force on a portion of said bottom surface of said end wall and on a portion of an inner seal surface of a seal element of said capsule or on a portion of said bottom surface of said end wall and on a portion of an inner side surface of said side surface to break said tether elements.

17. Measuring method according to claim 13, and further including, before connecting said capsule to said hollow gripping spindle, the step of mutually approaching said lifting and abutting device and said pusher device so that said abutting surface and said thrust surface abut on said end wall on opposite sides in order to engage said capsule in an engaging groove obtained on said abutting surface so that said capsule is locked angularly.

18. Measuring method according to claim 17, and further including, after said step of mutually approaching said lifting and abutting device and said pusher device, a phasing step of said capsule including rotating said lifting and abutting device around the rotation axis to orient said capsule on the basis of the position of a reference element of said capsule, the position of said reference element being detected by acquiring at least one image of said tamper evident band by said vision system.

19. Measuring method according to claim 17, and further including, after said step of mutually approaching said lifting and abutting device and said pusher device, a step of inspecting said capsule including rotating said lifting and abutting device around the rotation axis and acquiring at least one image of a zone of said tamper evident band said rotating said lifting and abutting device and said acquiring at least one image being able to be repeated until an image is obtained of the entire outer surface of said tamper evident band.

20. Measuring method according to claim 13, and further including the step of analyzing said detected force values to obtain production information on said capsule, this information being used by a main control unit to made a modification to one or more parts of a capsule production plant in which said capsule has been fabricated, said making a modification including correcting a cutting action of a cutting machine that generates said tamper evident band by replacing a worn blade or making changes to cutting parameters of said cutting machine.

* * * * *